(12) United States Patent
Watanabe et al.

(10) Patent No.: US 10,742,079 B2
(45) Date of Patent: Aug. 11, 2020

(54) ROTARY ELECTRIC MACHINE

(71) Applicant: MITSUBISHI ELECTRIC CORPORATION, Chiyoda-ku (JP)

(72) Inventors: Norihiro Watanabe, Chiyoda-ku (JP); Hideaki Arita, Chiyoda-ku (JP); Taiga Komatsu, Chiyoda-ku (JP); Tomoya Uchimura, Chiyoda-ku (JP); Toru Ogawa, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 51 days.

(21) Appl. No.: 16/092,868

(22) PCT Filed: Apr. 12, 2017

(86) PCT No.: PCT/JP2017/015002
§ 371 (c)(1),
(2) Date: Oct. 11, 2018

(87) PCT Pub. No.: WO2017/203877
PCT Pub. Date: Nov. 30, 2017

(65) Prior Publication Data
US 2019/0140497 A1    May 9, 2019

(30) Foreign Application Priority Data
May 24, 2016 (JP) .................. 2016-103196

(51) Int. Cl.
*H02K 1/22* (2006.01)
*H02K 1/24* (2006.01)
(Continued)

(52) U.S. Cl.
CPC ............. *H02K 1/243* (2013.01); *H02K 1/24* (2013.01); *H02K 1/27* (2013.01); *H02K 19/24* (2013.01); *H02K 21/044* (2013.01)

(58) Field of Classification Search
CPC ........................... H02K 1/243; H02K 21/044
See application file for complete search history.

(56) References Cited

U.S. PATENT DOCUMENTS 6,150,746 A    11/2000  Lechner
7,605,518 B2 * 10/2009  Nakamura ........... H02K 21/044
                                                    310/156.72
(Continued)

FOREIGN PATENT DOCUMENTS

JP    5-56616 A    3/1993
JP    8-98481 A    4/1996
(Continued)

OTHER PUBLICATIONS

International Search Report dated Jun. 27, 2017 in PCT/JP2017/015002 filed on Apr. 12, 2017.

*Primary Examiner* — Ramon M Barrera
(74) *Attorney, Agent, or Firm* — Xsensus LLP

(57) ABSTRACT

Magnets are disposed between adjacent first claw portions and second claw portions so as to protrude toward a second end in an axial direction from tips of the first claw portions and so as to protrude toward a first end in the axial direction from tips of the second claw portions, magnet holding members include a base portion that covers a radially outer surface of the magnets, and the base portion includes a high magnetic resistance portion that is disposed in a direction that is perpendicular to a direction from the first claw portions toward the second claw portions and parallel to the radially outer surface of the magnets so as to cross a magnetic path from the first claw portions toward the second claw portions in a region between the adjacent first claw portions and second claw portions.

20 Claims, 13 Drawing Sheets

(51) Int. Cl.
*H02K 1/27* (2006.01)
*H02K 19/24* (2006.01)
*H02K 21/04* (2006.01)

(56) References Cited

U.S. PATENT DOCUMENTS

| | | | |
|---|---|---|---|
| 9,124,164 B2 * | 9/2015 | Bauch | H02K 21/044 |
| 2004/0032183 A1 * | 2/2004 | Nakamura | H02K 21/044 |
| | | | 310/263 |
| 2004/0100162 A1 | 5/2004 | Maeda et al. | |
| 2006/0097605 A1 | 5/2006 | Maeda et al. | |
| 2007/0228866 A1 * | 10/2007 | Nakamura | H02K 21/044 |
| | | | 310/263 |
| 2009/0079285 A1 | 3/2009 | Koumura | |
| 2012/0032548 A1 * | 2/2012 | Bauch | H02K 21/044 |
| | | | 310/156.16 |

FOREIGN PATENT DOCUMENTS

| | | |
|---|---|---|
| JP | 9-98556 A | 4/1997 |
| JP | 11-262227 A | 9/1999 |
| JP | 2004-135473 A | 4/2004 |
| JP | 2006-109573 A | 4/2006 |
| JP | 2009-77588 A | 4/2009 |

* cited by examiner

FIRST COMPARATIVE EXAMPLE

FIRST COMPARATIVE EXAMPLE

SECOND COMPARATIVE EXAMPLE

SECOND COMPARATIVE EXAMPLE

ROTARY ELECTRIC MACHINE

TECHNICAL FIELD

The present invention relates to a rotary electric machine that includes a rotor that has a claw-shaped field core, and particularly relates to a holding construction for magnets that are disposed between claw portions of the claw-shaped field core.

BACKGROUND ART

In conventional rotary electric machine rotors, magnets have been formed so as to have a cylindrical shape that has groove portions that fit together with claw-shaped magnetic poles, the claw-shaped magnetic poles being fitted into the groove portions from two ends of these cylindrical magnets, and the magnets being fixed to the claw-shaped magnetic poles using adhesive (see Patent Literature 1, for example).

In other conventional rotary electric machine rotors, constructions have been disclosed in which box-shaped holders that have openings on first surfaces are stacked so as to face each other, magnets are housed therein, and the magnets are held using elastic forces that are generated by flexing protruding portions that are formed on these boxes (see Patent Literature 2, for example).

CITATION LIST

Patent Literature

Patent Literature 1: Japanese Patent Laid-Open No. HEI 8-98481 (Gazette)
Patent Literature 2: Japanese Patent Laid-Open No. 2009-77588 (Gazette)

SUMMARY OF THE INVENTION

Problem to be Solved by the Invention

In the conventional rotary electric machine rotor according to Patent Literature 1, because the magnets are formed so as to have a cylindrical shape that has groove portions that fit together with the claw-shaped magnetic poles, there has been a possibility that the claw-shaped magnetic poles and magnets may scrape together when assembling the claw-shaped magnetic poles and the magnets, or that the claw-shaped magnetic poles and the magnets may come into contact due to circumferential misalignment, giving rise to cracking and chipping of the magnets. Centrifugal forces also act on the magnets due to rotation of the rotor, and there has been a possibility that the magnets may be damaged thereby.

In the conventional rotary electric machine rotor according to Patent Literature 1, increased output can be achieved in the rotary electric machine by disposing the magnets between the claw-shaped magnetic poles. However, because the magnets are present beyond the tips of the claw-shaped magnetic poles, magnetic flux that is generated by the portions of the magnets that extend beyond the tips of the claw-shaped magnetic poles leaks toward the stator. Thus, if the rotor is rotated when a field current is not being applied, then the interterminal voltage of the stator rises. If this interterminal voltage exceeds the battery voltage, then that voltage surplus must be expended by the regulator, leading to new problems due to this electric power generation energy being expended wastefully.

In the conventional rotary electric machine rotor according to Patent Literature 2, because the magnets are housed inside box-shaped stainless-steel holders, and are disposed between the claw-shaped magnetic poles, the occurrence of cracking or chipping of the magnets that results from contact with claw-shaped magnetic poles or from centrifugal forces in Patent Literature 1 can be suppressed. However, since stainless steels may have magnetism depending on the materials, magnetic short-circuiting may arise between adjacent claw-shaped magnetic poles due to holders that entirely surround the magnets being disposed between the claw-shaped magnetic poles, and one problem has been that output from the rotary electric machine is reduced.

The present invention aims to solve the above problems and an object of the present invention is to provide a rotary electric machine that includes a rotor that enables increases in output when output is required, by suppressing the occurrence of damage to magnets that results from contact with claw portions during assembly and from centrifugal forces, and also suppressing increases in interterminal voltages in a stator when an electric current is not being passed through a field coil.

Means for Solving the Problem

A rotary electric machine according to the present invention includes: a rotor that includes: field core that includes first claw portions and second claw portions that are arranged alternately in a circumferential direction around an outer circumferential portion, the first claw portions extending from a first end toward a second end in an axial direction and the second claw portions extending from the second end toward the first end in the axial direction; a field coil that is mounted to the field core; and magnet holding members that are made of a magnetic material, the magnet holding members being disposed between adjacent first claw portions and second claw portions among the first claw portions and the second claw portions in a state in which magnets are housed and held; and a stator that includes: a stator core that is made of a magnetic material; and a stator coil that is mounted to the stator core, the stator being disposed so as to face the rotor in a radial direction so as to have an air gap interposed. The magnets are disposed between the adjacent first claw portions and second claw portions so as to protrude toward the second end in the axial direction from tips of the first claw portions and so as to protrude toward the first end in the axial direction from tips of the second claw portions, the magnet holding members include a base portion that covers a radially outer surface of the magnets, the base portion includes a high magnetic resistance portion that is disposed in a direction that is perpendicular to a direction from the first claw portions toward the second claw portions and parallel to the radially outer surface of the magnets so as to cross a magnetic path from the first claw portions toward the second claw portions in a region between the adjacent first claw portions and second claw portions, and magnetic resistance in the high magnetic resistance portion is greater than magnetic resistance in regions of the base portion other than the high magnetic resistance portion.

Effects of the Invention

According to the present invention, because the magnets are disposed between the adjacent first claw portions and second claw portions so as to protrude toward the second end in the axial direction from tips of the first claw portions and so as to protrude toward the first end in the axial direction from tips of the second claw portions, magnet volume is increased, enabling increases in output to be achieved.

Because the magnets are housed and held in magnet holding members that are made of a magnetic material, contact between the magnets and the first and second claw portions during assembly in a radial direction of the rotor is eliminated, suppressing the occurrence of damage to the magnets.

Because the magnet holding members that are made of a magnetic material cover a radially outer surface of the magnets, the amount of magnetic flux that leaks toward the stator from magnet portions that protrude toward the second axial end from the tips of the first claw portions and from magnet portions that protrude toward the first axial end from the tips of the second claw portions can be reduced. Thus, increases in interterminal voltages in the stator can be suppressed when an electric current is not being passed through a field coil.

Because the high magnetic resistance portion is formed on the base portion, magnetic short-circuiting between the first and second claw portions is suppressed, enabling decreases in output to be suppressed.

DESCRIPTION OF EMBODIMENTS

Preferred embodiments of a stator for a rotary electric machine according to the present invention will now be explained with reference to the drawings.

Embodiment 1

Figure 1:
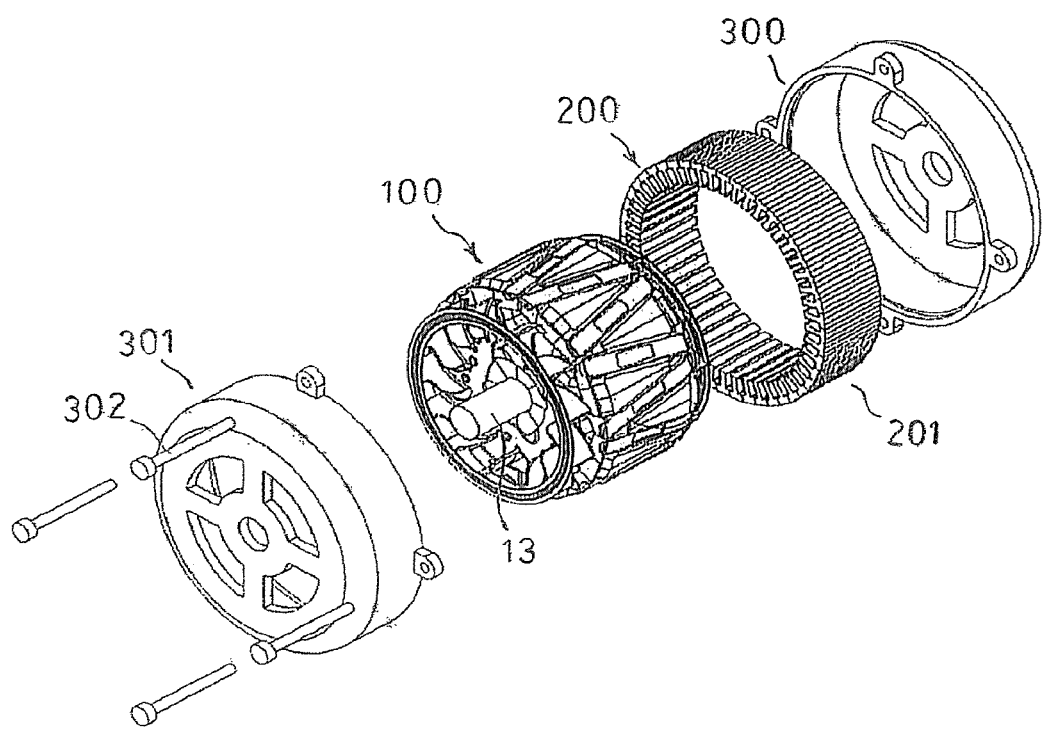
FIG. 1 is an exploded oblique projection that shows a rotary electric machine according to Embodiment 1 of the present invention.
Figure 2:
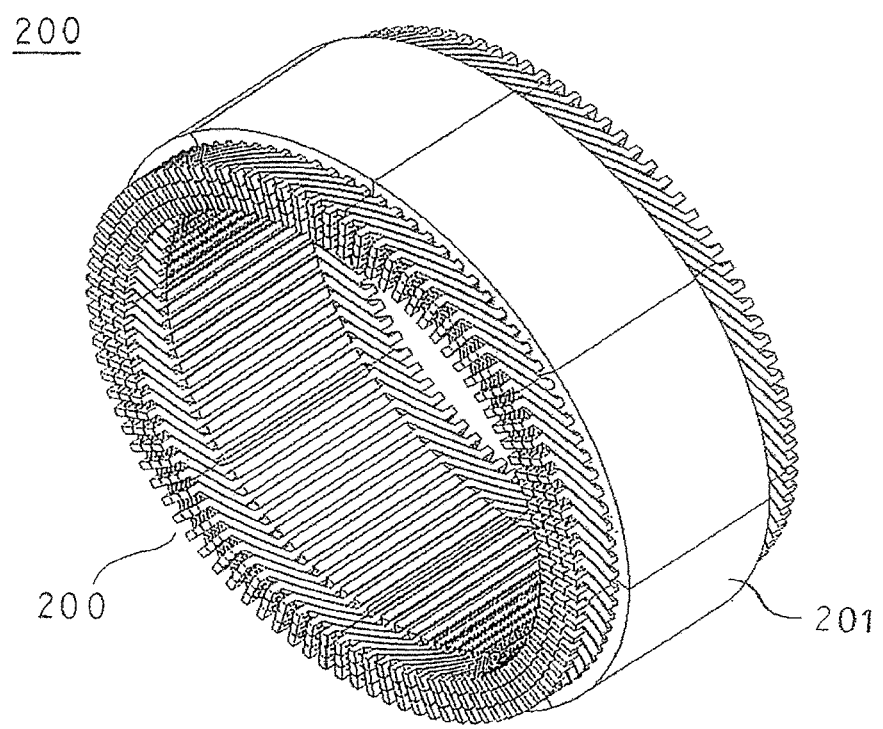
FIG. 2 is an oblique projection that shows a stator of the rotary electric machine according to Embodiment 1 of the present invention.

FIG. 1 is an exploded oblique projection that shows a rotary electric machine according to Embodiment 1 of the present invention, and FIG. 2 is an oblique projection that shows a stator of the rotary electric machine according to Embodiment 1 of the present invention.

In FIGS. 1 and 2, the rotary electric machine includes: a rotor 100 that has magnetic poles, the rotor being supported by a rotating shaft 13; a stator 200 in which a stator coil 202 is mounted to an annular stator core 201; and a frame portion that has a rear frame 300 and a front frame 301. This rotary electric machine is installed such that the rotating shaft 13 is oriented vertically, for example. The stator 200 is held in the rear frame 300 and the front frame 301 by fastening four bolts 302 such that an outer edge portion of the stator core 201 is clamped between the rear frame 300 and the front frame 301 from two axial directions. The rotor 100 is disposed coaxially and rotatably on a radially inner side of the stator 200 such that the rotating shaft 13 is supported by bearings (not shown) that are mounted at central axial positions of the rear frame 300 and the front frame 301.

Figure 3:
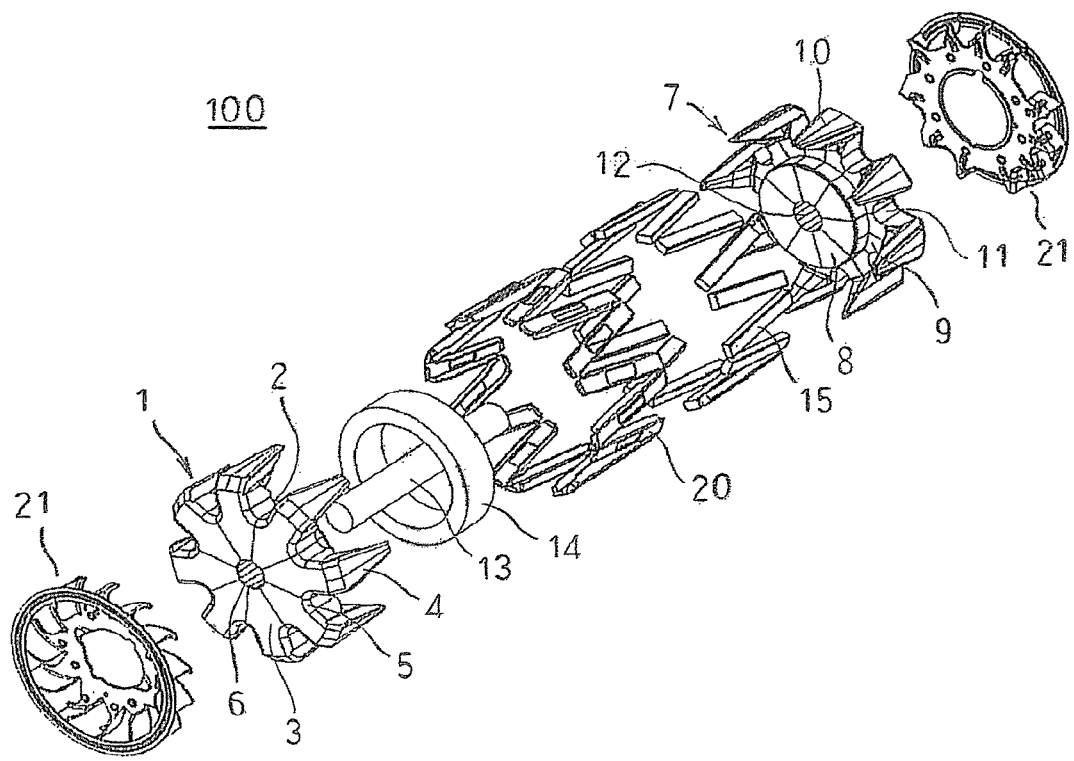
FIG. 3 is an exploded oblique projection that shows a construction of a rotor of the rotary electric machine according to Embodiment 1 of the present invention.
Figure 4:
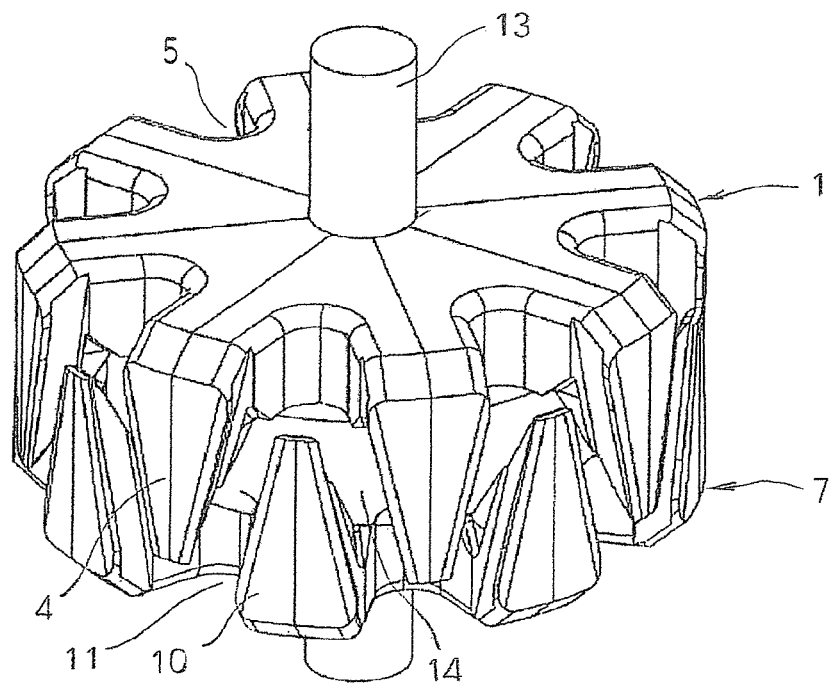
FIG. 4 is an oblique projection that shows an assembled state of a claw-shaped field core in the rotor of the rotary electric machine according to Embodiment 1 of the present invention.
Figure 5:
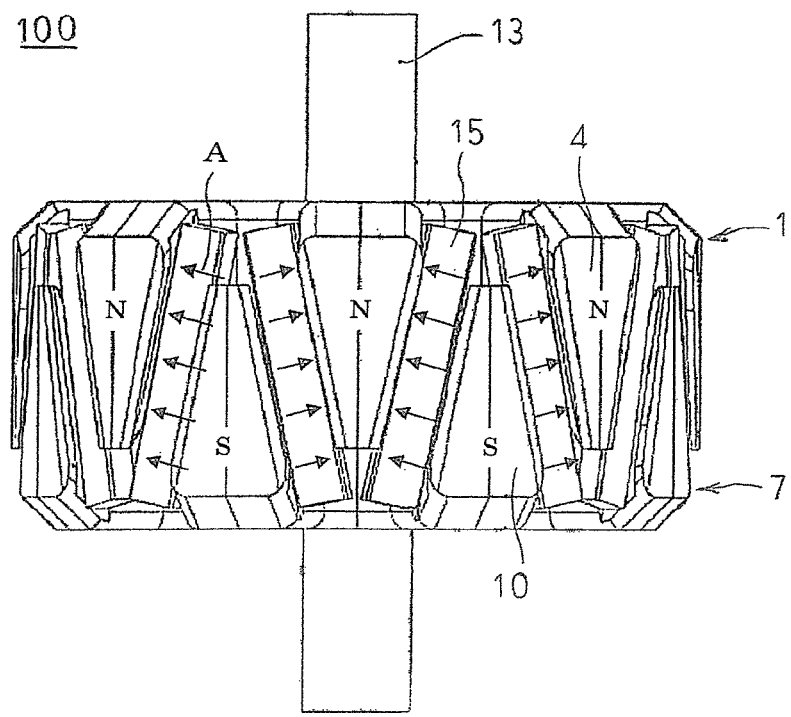
FIG. 5 is a side elevation in which the rotor of the rotary electric machine according to Embodiment 1 of the present invention is viewed from radially outside.

Next, a construction of the rotor 100 will be explained. FIG. 3 is an exploded oblique projection that shows a construction of a rotor for the rotary electric machine according to Embodiment 1 of the present invention, FIG. 4 is an oblique projection that shows an assembled state of a claw-shaped field core in the rotor for the rotary electric machine according to Embodiment 1 of the present invention, and FIG. 5 is a side elevation in which the rotor for the rotary electric machine according to Embodiment 1 of the present invention is viewed from radially outside.

The rotor 100, as shown in FIG. 3, includes: a field coil 14 that generates magnetic flux on passage of an excitation current; first and second claw-shaped field cores 1 and 7 that are made of iron, that are disposed so as to cover the field coil 14, and in which magnetic poles are formed by the magnetic flux; and the rotating shaft 13, which is fixed to central axial positions of the first and second claw-shaped field cores 1 and 7.

The first claw-shaped field core 1 has: a first boss portion 2 that is formed such that an outer circumferential surface has a cylindrical shape, and such that a rotating shaft insertion aperture 6 passes through a central position; a thick ring-shaped first yoke portion 3 that protrudes radially outward from a first axial end edge portion of the first boss portion 2; and eight first claw portions 4 that are respectively arranged at a uniform angular pitch circumferentially so as to each extend outward at a second axial end from an outer circumferential portion of the first yoke portion 3. The first claw portions 4 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip. First trough portions 5 are formed so as to form hollows radially inward and pass through axially on respective portions that are positioned between the adjacent first claw portions 4 of the first yoke portion 3.

The second claw-shaped field core 7 has: a second boss portion 8 that is formed such that an outer circumferential surface has a cylindrical shape, and such that a rotating shaft insertion aperture 12 passes through a central position; a thick ring-shaped second yoke portion 9 that protrudes radially outward from a second axial end edge portion of the second boss portion 8; and eight second claw portions 10 that are respectively arranged at a uniform angular pitch circumferentially so as to each extend outward at a first axial end from an outer circumferential portion of the second yoke portion 9. The second claw portions 10 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip. Second trough portions 11 are formed so as to form hollows radially inward and pass through axially on respective portions that are positioned between the adjacent second claw portions 10 of the second yoke portion 9.

First and second claw-shaped field cores 1 and 7 that are configured in this manner are fixed to the rotating shaft 13 that has been press-fitted into the rotating shaft insertion apertures 6 and 12 such that the first and second claw portions 4 and 10 alternately intermesh and a second end surface of the first boss portion 2 and a first end surface of the second boss portion 8 butt together, as shown in FIG. 4, to form a rotor core. The rotor core that is configured in this manner has an outer circumferential surface that is formed into an approximately cylindrical surface, and circumferential positions of the first and second claw-shaped field cores 1 and 7 are adjusted such that circumferential spacing between each of the first and second claw portions 4 and 10 is equal. The field coil 14 is thereby mounted in a space that is surrounded by the first and second boss portions 2 and 8, the first and second yoke portions 3 and 9, and the first and second claw portions 4 and 10.

In FIG. 5, magnets 15 are respectively disposed between circumferentially adjacent first and second claw portions 4 and 10. The magnets 15 are respectively magnetized so as to have North-seeking (N) poles in a direction of arrows A so as to suppress magnetic flux leakage from the magnetic poles that are generated in the first and second claw portions 4 and 10 by an electric current that is passed to the field coil 14. In addition, the magnets 15 respectively extend outward to a vicinity of root portions of the second and first claw portions 10 and 4 so as to be disposed beyond tips of first and second claw portions 4 and 10. Moreover, although not shown, the magnets 15 are housed and held on a radially inner side of first magnet holders 20 (described below).

Next, a magnetic circuit of a rotary electric machine that has the claw-shaped magnetic poles will be explained. Here, in order to explain the significance of disposing the magnets 15 between the first and second claw portions 4 and 10 so as to be disposed beyond claw tips, a magnetic circuit of a construction of a first comparative example in which magnets 15 are not disposed between the first and second claw portions 4 and 10 will first be explained using FIGS. 6 and 7. Next, a second comparative construction in which magnets 150 are disposed between first and second claw portions 4 and 10 so as not to be disposed beyond claw tips for increased output will be explained using FIGS. 8 and 9, and lastly, a construction according to the present invention in which magnets 15 are disposed between the first and second claw portions 4 and 10 so as to extend beyond the claw tips will be explained using FIG. 10.

Figure 6:
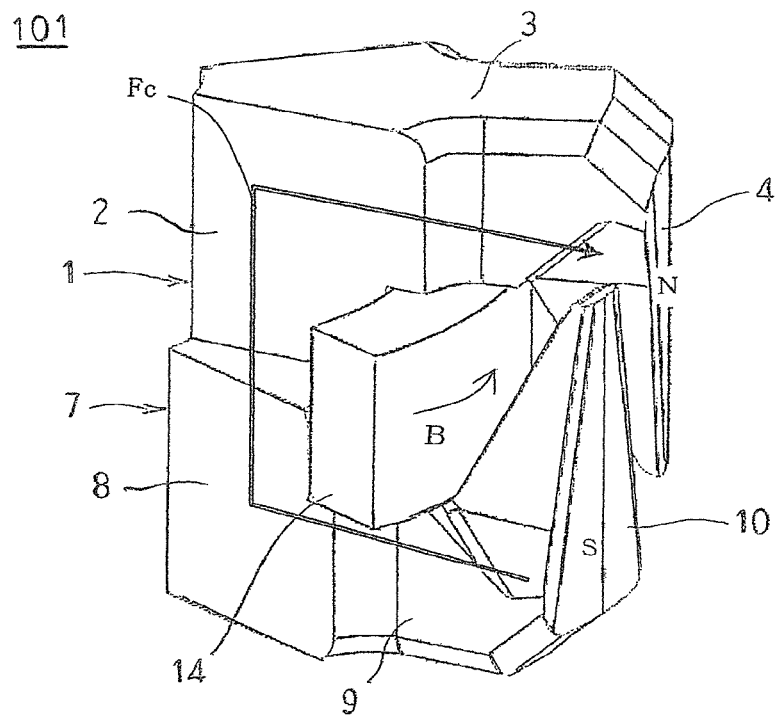
FIG. 6 is a partial oblique projection that explains shapes of single pole portions of a first claw-shaped field core and a second claw-shaped field core that constitute part of a rotor of a rotary electric machine of a first comparative example.
Figure 7:
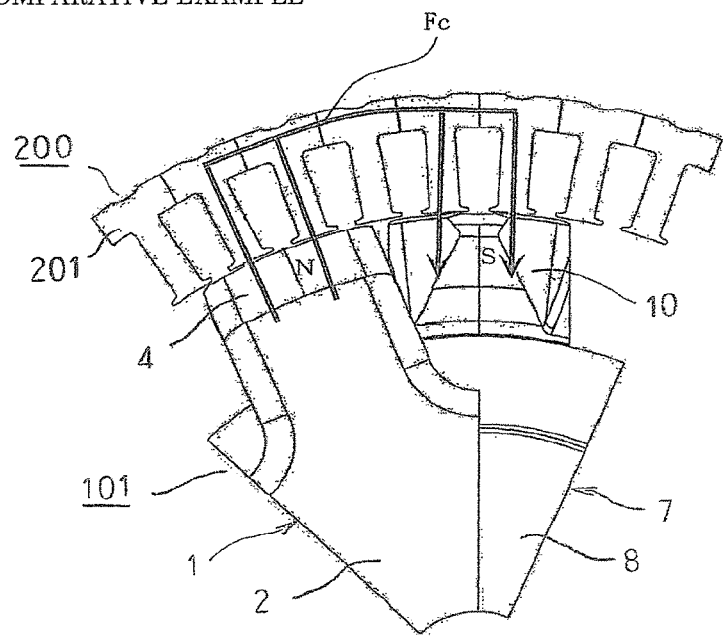
FIG. 7 is a partial side elevation that explains positional relationships between the single pole portions of the first claw-shaped field core and the second claw-shaped field core that constitute part of the rotor of the rotary electric machine of the first comparative example and a stator.
Figure 8:
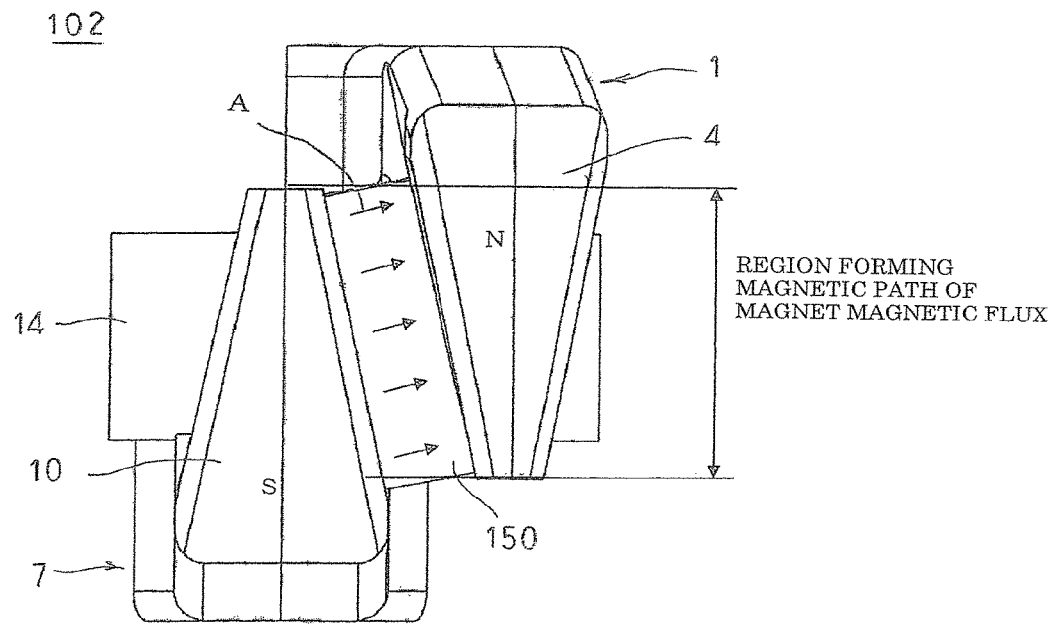
FIG. 8 is a partial side elevation that explains a state in which magnets are disposed between claw portions of a first claw-shaped field core and a second claw-shaped field core that constitute part of a rotor of a rotary electric machine of a second comparative example.
Figure 9:
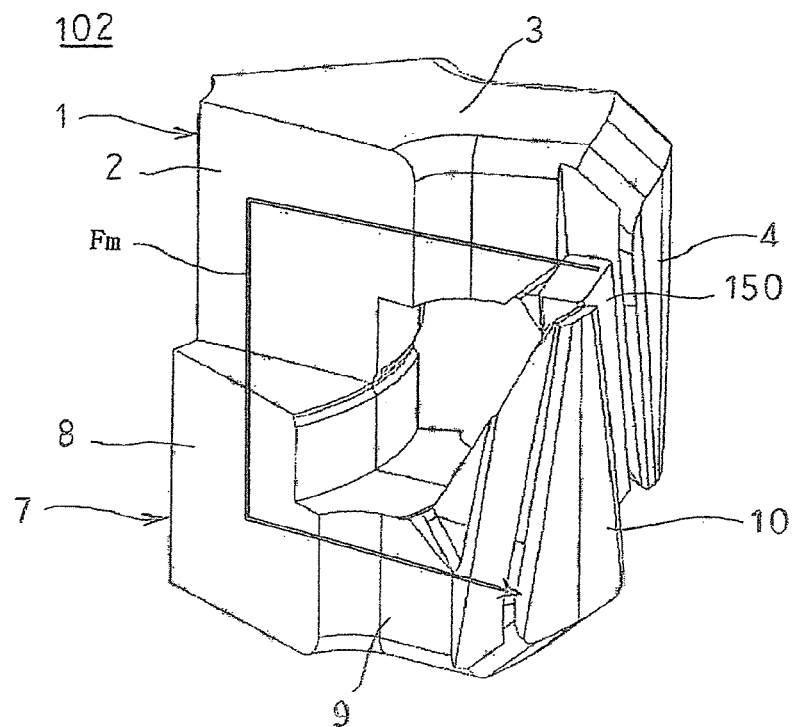
FIG. 9 is a partial oblique projection that explains the state in which magnets are disposed between the claw portions of the first claw-shaped field core and the second claw-shaped field core that constitute part of the rotor of the rotary electric machine of the second comparative example.
Figure 10:
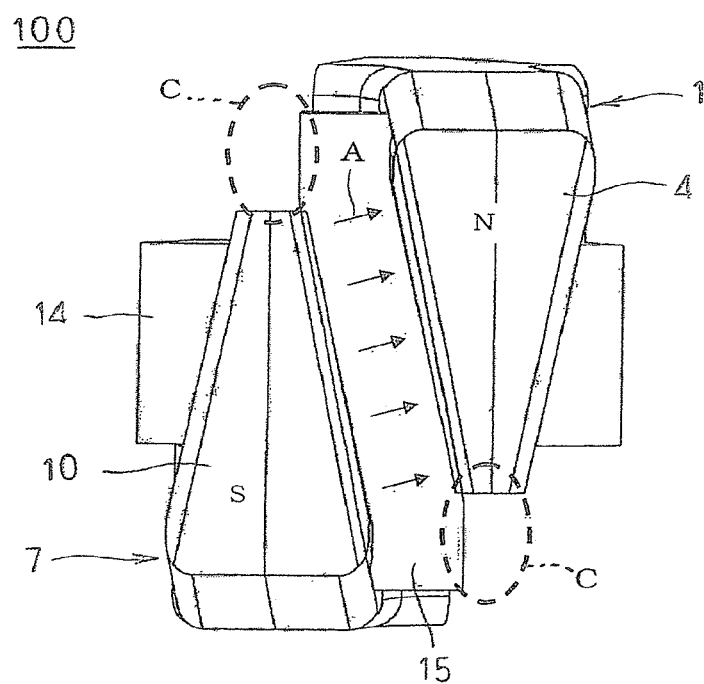
FIG. 10 is a partial side elevation that explains a state in which magnets are disposed between claw portions of a first claw-shaped field core and a second claw-shaped field core that constitute part of the rotor of the rotary electric machine according to Embodiment 1 of the present invention.

FIG. 6 is a partial oblique projection that explains shapes of single pole portions of a first claw-shaped field core and a second claw-shaped field core that constitute part of a rotor of a rotary electric machine of a first comparative example, FIG. 7 is a partial side elevation that explains positional relationships between the single pole portions of the first claw-shaped field core and the second claw-shaped field core that constitute part of the rotor of the rotary electric machine of the first comparative example and a stator, FIG. 8 is a partial side elevation that explains a state in which magnets are disposed between claw portions of a first claw-shaped field core and a second claw-shaped field core that constitute part of a rotor of a rotary electric machine of a second comparative example, FIG. 9 is a partial oblique projection that explains the state in which magnets are disposed between the claw portions of the first claw-shaped field core and the second claw-shaped field core that constitute part of the rotor of the rotary electric machine of the second comparative example, and FIG. 10 is a partial side elevation that explains a state in which magnets are disposed between claw portions of a first claw-shaped field core and a second claw-shaped field core that constitute part of the rotor of the rotary electric machine according to Embodiment 1 of the present invention.

In FIG. 6, the field coil 14 is disposed in a space that is surrounded by the first and second boss portions 2 and 8 of the first and second claw-shaped field cores 1 and 7, the first and second yoke portions 3 and 9, and the first and second claw portions 4 and 10.

In a first comparative rotor 101 that has a configuration of this kind, by applying an electric current to the field coil 14 in the direction of an arrow B in FIG. 6, magnetic flux Fc flows though the first and second claw-shaped field cores 1 and 7 in the direction of an arrow in FIG. 6. North-seeking (N) poles are generated in the first claw portion 4 by this magnetic flux Fc, and South-seeking (5) magnetic poles in the second claw portion 10.

In this manner, the magnetic flux Fc that is generated by the first comparative rotor 101 forms a magnetic path that, as indicated by arrows in the diagram in FIG. 7, crosses over to the stator 200 from the first claw portions 4 (the N poles) through the very small gap between the rotor and the stator 200, flows through the stator 200 to positions that face the second claw portions 10, and returns to the second claw portions 10 (the S poles) of the rotor again.

This magnetic flux Fc that is generated by the rotor 101 interlinks with the stator 200, and the rotor 101 rotates due to interaction with rotating magnetic fields that are generated by three-phase alternating current in the stator 200.

In the magnetic circuit of a first comparative rotary electric machine that has claw-shaped magnetic poles that have a configuration of this kind, first and second claw portions 7 and 10 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip. Thus, by increasing the value of the electric current that is supplied to the field coil 14, the amount of magnetic flux Fc that flows through the magnetic circuit is increased, enabling a high-torque rotary electric machine to be obtained.

However, in the magnetic circuit of the first comparative rotary electric machine, which has claw-shaped magnetic poles, because there is a limit to the amount of magnetic flux Fc that can pass through the circuit due to constraints (hereinafter called "magnetic saturation") that depend on the cross-sectional area of the magnetic circuit, the amount of magnetic flux Fc cannot be increased even if the rate of passage of current to the field coil 14 is increased.

In order to solve problems of this kind, in a second comparative rotor 102, a magnet 150 in which an N pole is magnetized in the direction of arrows A, as shown in FIG. 8, is disposed between a first claw portion 4 and a second claw portion 10. The magnetic flux Fm that the magnet 150 generates thereby flows as indicated by an arrow in FIG. 9. Since this magnetic flux Fm has an opposite orientation to the magnetic flux Fc that the field coil 14 generates, the above-mentioned magnetic saturation of the magnetic circuit can be alleviated. Thus, since more of the magnetic flux Fc that the field coil 14 produces can pass through the first claw portion 4 and the second claw portion 10, the amount of magnetic flux in the first claw portion 4 and the second claw portion 10 can be increased. The magnet 150 is disposed between the first claw portion 4 and the second claw portion 10, as shown in FIG. 8, and a region where the first claw portion 4 and the second claw portion 10 intersect becomes the magnetic path of the magnetic flux Fm. Thus, the configuration is such that the magnetic circuit of the magnetic flux Fm in the absence of passage of electric current is a closed magnetic circuit within the rotor 102, and the magnetic flux Fm does not leak toward the stator 200 significantly.

Using similar thinking, the magnets 15 are disposed between first claw portions 4 and second claw portions 10 such that N poles are magnetized in the direction of arrows A and so as to extend beyond both claw tips, as shown in FIG. 10. In the rotor 100 that is configured in this manner, because magnet volume can be increased compared to the second comparative rotor 102, the magnetic flux Fm from the magnets 15 that flows through the magnetic circuit can be increased, enabling magnetic saturation of the magnetic circuit to be further alleviated.

However, in magnets 15 that are disposed so as to extend beyond the claw tips, since claw portions are not present in the portions that extend beyond the claw tips, as indicated by broken-line circle portions C, the magnetic path of the magnetic flux Fm that is generated by the magnets 15 is not formed inside the rotor 100. Because of that, the magnetic flux Fm that is generated by the magnets 15 leaks toward the stator 200 from these broken-line circle portions C. Due to the magnetic flux Fm from the magnets 15 leaking from the rotor 100 to the stator 200 in this manner, this magnetic flux that interlinks with the stator 200 changes as the rotor 100 rotates, and voltage is induced in the stator coil. Since this voltage increases in proportion to rotational frequency, the voltage that is induced in the stator coil exceeds the battery voltage during high-speed rotation. Since the configuration is such that generated electric power is expended using a protective resistance (a regulator) in situations in which electric power generation is not required in order to protect the battery, one problem has been that this electric power generation energy is expended wastefully, reducing the efficiency of systems into which this rotary electric machine is incorporated.

Figure 11:
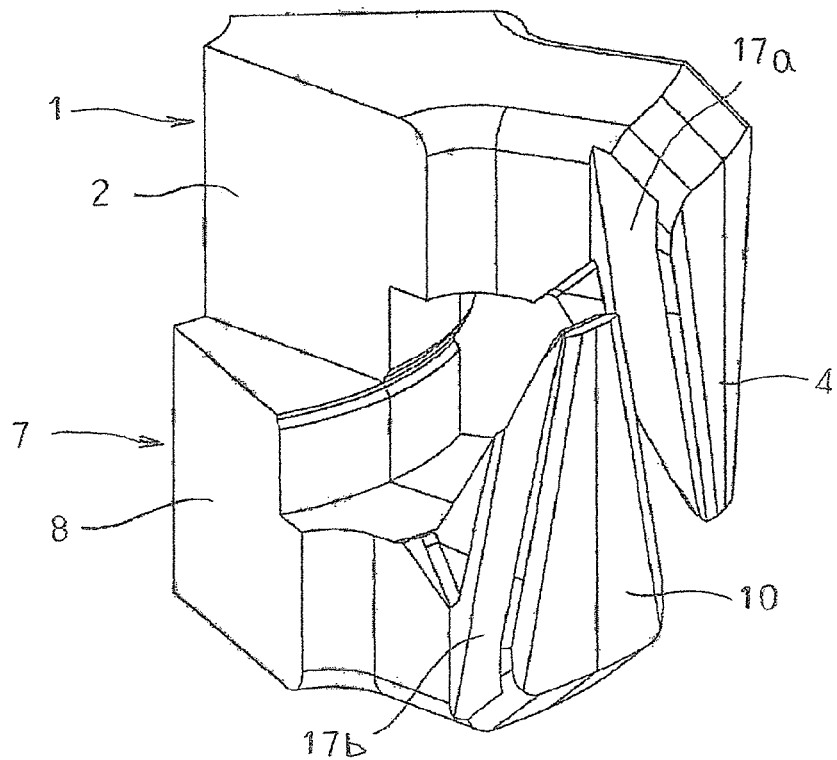
FIG. 11 is a partial oblique projection that shows a state in which shapes of single pole portions of the first claw-shaped field core and the second claw-shaped field core in the rotor of the rotary electric machine according to Embodiment 1 of the present invention are extracted.

Next, a holding construction for the magnets 15 will be explained. FIG. 11 is a partial oblique projection that shows a state in which shapes of single pole portions of the first claw-shaped field core and the second claw-shaped field core in the rotor of the rotary electric machine according to Embodiment 1 of the present invention are extracted, FIG. 12 is an oblique projection that shows a state of a first magnet holder and a magnet in the rotor of the rotary electric machine according to Embodiment 1 of the present invention before assembly, and FIG. 13 is a partial side elevation in which a mounted state of first magnet holders in the rotor of the rotary electric machine according to Embodiment 1 of the present invention is viewed from radially outside.

In FIG. 11, claw groove portions 17a that function as guiding groove portions are formed on two circumferential side surfaces of first claw portions 4 so as to have a constant groove width. Claw groove portions 17a that function as guiding groove portions are similarly formed on two circumferential side surfaces of second claw portions 10 so as to have a constant groove width. These claw groove portions 17a and 17b form facing parallel flat surfaces, and form magnet housing spaces between circumferentially adjacent first and second claw portions 4 and 10.

Next, individual constructions and assembled constructions of the first magnet holders 20 and the magnets 15 will be explained. In FIG. 12, the magnet 15 is produced so as to have a rectangular parallelepipedic shape in which four long sides that extend in an axial direction are chamfered. Here in FIG. 12, the "axial direction" is a direction that is parallel to a long-side direction of a radially outer surface of the magnet 15, and a "circumferential direction" is a direction that is perpendicular to the long-side direction that is parallel to a short-side direction of the radially outer surface of the magnet 15. In FIG. 12, the axial direction coincides with the direction of insertion of the magnet 15. A first magnet holder 20 that functions as a magnet holding member is produced using a metal material that has magnetic properties such as a rolled steel sheet, etc., and includes a flat rectangular base portion 20e, and an oblong aperture 20d that functions as a high magnetic resistance portion is formed on a central portion of the base portion 20e such that long sides thereof are parallel to the long sides of the base portion 20e. Moreover, the "axial direction" of the first magnet holder 20 is a direction that is parallel to the long-side direction of the base portion 20e, and a "circumferential direction" is a direction that is perpendicular to the long-side direction and parallel to the short-side direction of the base portion 20e.

Figure 12:
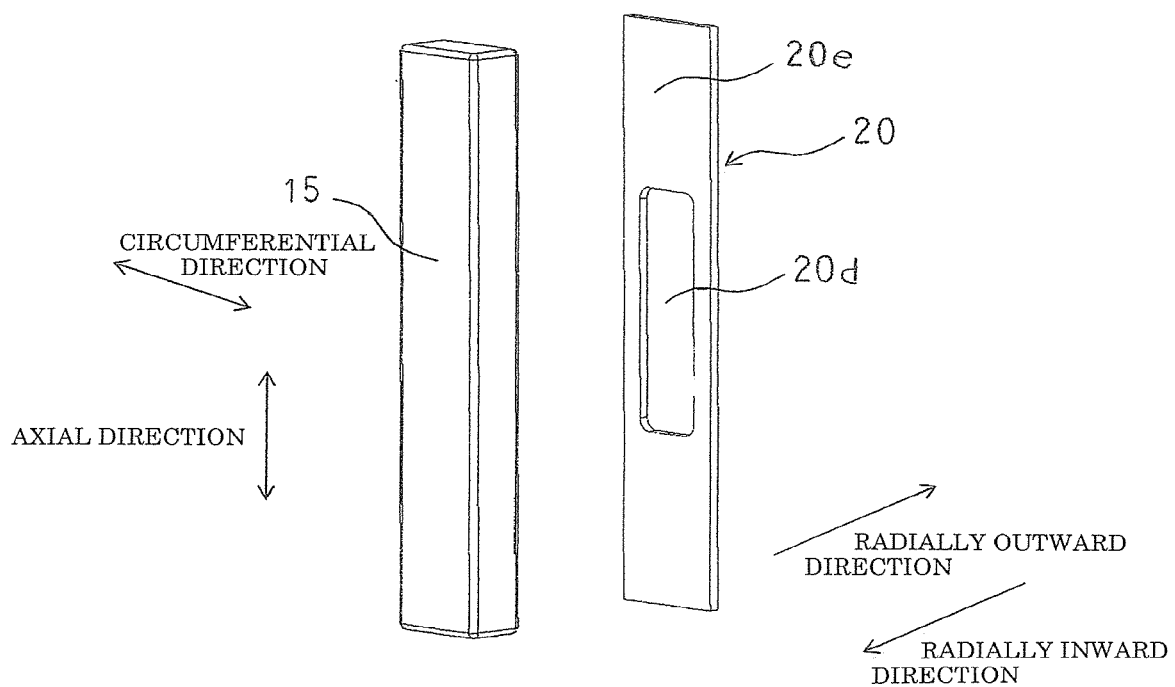
FIG. 12 is an oblique projection that shows a state of a first magnet holder and a magnet in the rotor of the rotary electric machine according to Embodiment 1 of the present invention before assembly.
Figure 13:
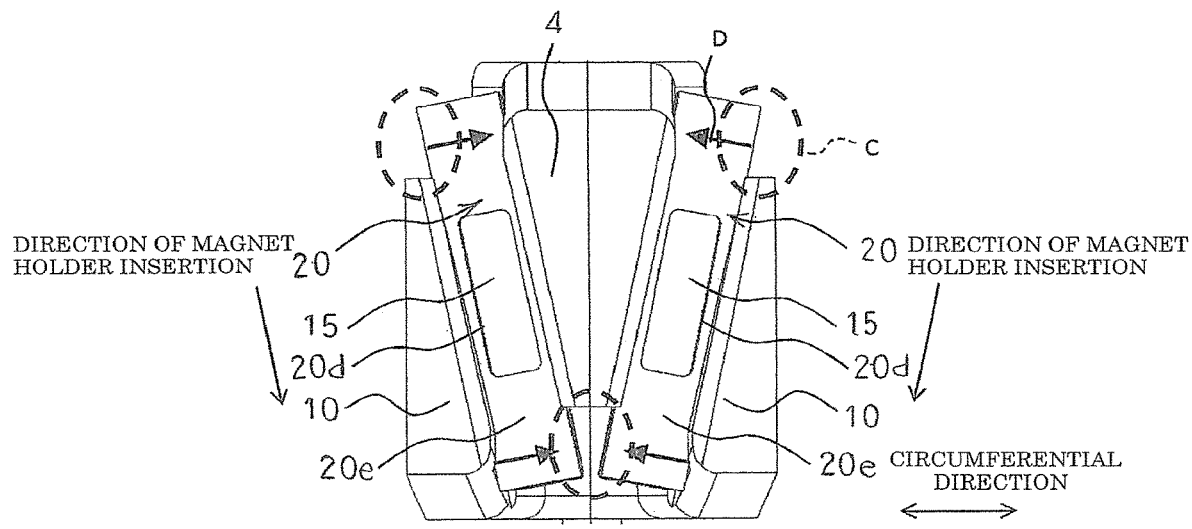
FIG. 13 is a partial side elevation in which a mounted state of first magnet holders in the rotor of the rotary electric machine according to Embodiment 1 of the present invention is viewed from radially outside.

As shown in FIG. 12, the magnet 15 that is configured in this manner is moved radially outward so as to be housed on a radially inner side of the first magnet holder 20. Then, the magnet 15 and the first magnet holder 20 are fixed by adhesive so as to be integrated.

Next, an assembled state of the rotor core and the first magnet holders 20 that have been integrated with the magnets 15 will be explained using FIG. 13. The first magnet holders 20 are inserted into the magnet housing spaces that are formed between the claw groove portions 17a and 17b that are formed on the facing side surfaces of the circumferentially adjacent first and second claw portions 4 and 10 from a direction of magnet holder insertion parallel to the inclination of the first and second claw portions 4 and 10. Then, the first and second claw portions 4 and 10 and the first magnet holders 20 that have been integrated with the magnets 15 are fixed using an adhesive, for example, so as to be integrated. Moreover, the "direction of magnet holder insertion" is a direction that is perpendicular to a direction from the first claw portion 4 toward the second claw portion 10, and coincides with the axial direction of the magnets 15 and the magnet holders 20. Furthermore, the direction from the first claw portion 4 toward the second claw portion 10 coincides with the circumferential direction of the magnets 15 and the magnet holders 20.

According to Embodiment 1, since there is a wall (the base portion 20e) in a radially outward direction of the first magnet holders 20, as shown in FIG. 12, when inserting the magnets 15 into the magnet housing spaces between the first and second claw portions 4 and 10 from the direction of magnet holder insertion, the base portions 20e of the first magnet holders 20 rub against the claw groove portions 17a and 17b while being inserted. Thus, because the magnets 15 and the claw groove portions 17a and 17b do not contact directly, the occurrence of cracking or chipping of the magnets 15 during assembly can be prevented.

As shown in FIG. 13, the magnets 15 that are held by the first magnet holders 20 are disposed so as to be extend beyond claw tips of the first claw portions 4 and the second claw portions 10, as indicated by the broken-line circle portions C. Since the first magnet holders 20 are magnetic, and the first magnet holders 20, which are constituted by a magnetic material, contact the magnets 15 and the first and second claw portions 4 and 10 even where the magnets 15 are disposed so as to be extend beyond the claw tips, a magnetic path can be formed in the direction that is indicated by arrows D. Thus, a magnetic circuit that is closed within the rotor 100 can be formed, enabling leaking of the magnetic flux Fm from the magnets 15 toward the stator 200 to be suppressed. Thus, even if the rotor 100 rotates at high speed in a state in which field current is not being supplied to the field coil 14, voltages that are induced in the stator 200 can be kept low. Consequently, wasted electric power generation can be prevented, enabling system efficiency to be improved.

As explained in FIGS. 8 and 9, since the first claw portions 4 and the second claw portions 10 constitute a region that forms a magnetic path for the magnetic flux Fm from the magnets 15, the magnetic circuit is closed within the rotor 100, and since magnetic flux does not leak toward the stator 200, no-load induced voltages will not rise. When magnetic bodies are disposed between the first and second claw portions 4 and 10, a magnetic short-circuit is formed instead, reducing the magnetic flux density of the magnetic poles, thereby reducing output. In Embodiment 1, apertures 20d that are disposed centrally in a radially outward direction of the first magnet holders 20 are disposed on intermediate portions between the first claw portions 4 and the second claw portions 10 in the first magnet holders 20, and a magnetic path that is formed at the base portions 20e is in a direction that is perpendicular to the direction from the first claw portions 4 toward the second claw portions 10, crossing over in a direction that is parallel to the radially outer surface of the magnets 15. Thus, magnetic resistance through the first magnet holders 20 between the facing first and second claw portions 4 and 10 is increased, enabling magnetic short-circuiting between the first and second claw portions 4 and 10 to be suppressed. The magnetic flux density of the first and second claw portions 4 and 10 is increased thereby, enabling the amount of magnetic flux that interlinks with the stator 200 to be increased. Using a configuration of this kind, a rotary electric machine that enables increases in output can be achieved while suppressing increases in no-load induced voltage.

Figure 14:
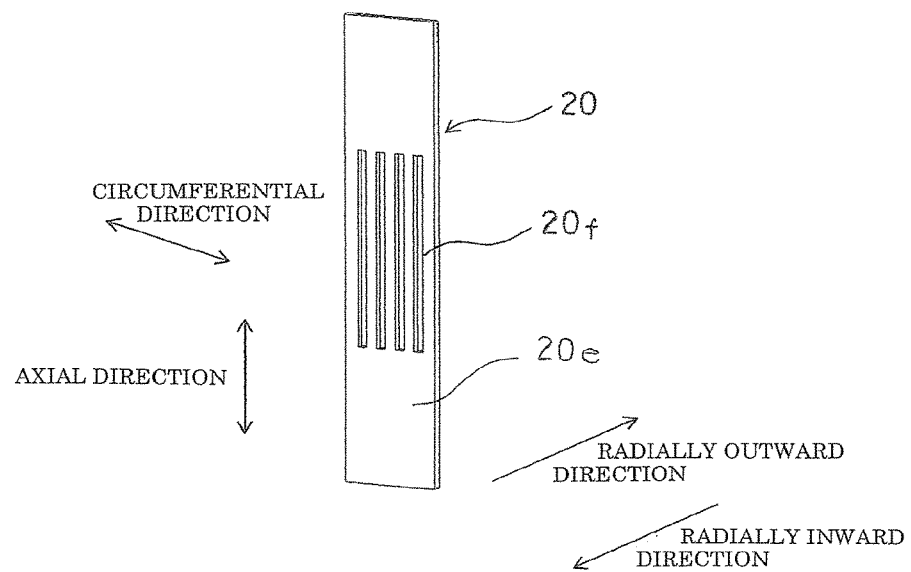
FIG. 14 is an oblique projection that shows a variation of the first magnet holder in the rotor of the rotary electric machine according to Embodiment 1 of the present invention.

Moreover, in Embodiment 1 above, the high magnetic resistance portion is constituted by an approximately rectangular single aperture 20d that is formed on a base portion 20e, but the high magnetic resistance portion is not limited thereto, and need only be formed into a region that has higher magnetic resistance than other regions. For example, the high magnetic resistance portion may be constituted by a large number of apertures that are formed in a matrix pattern to the base portion 20e, or the high magnetic resistance portion may be constituted by approximately rectangular thin portions that are formed on the base portion 20e, or the high magnetic resistance portion may be constituted by a plurality of slits 20f in which notches that are formed axially on the base portion 20e are arranged in a circumferential direction, as shown in FIG. 14. Here in FIG. 14, the axial direction coincides with the axial direction of the magnets 15, and is a direction that is perpendicular to the direction from the first claw portions 4 toward the second claw portions 10 that is parallel to the radially outer surface of the magnets 15. The circumferential direction coincides with the circumferential direction of the magnets 15, and is the direction from the first claw portion 4 toward the second claw portion 10. In FIG. 14, the axial direction coincides with the direction of insertion of the magnets 15.

Thus, in the high magnetic resistance portions, magnetic resistance in the base portions in the direction from the first claw portion 4 toward the second claw portion 10 is greater than the magnetic resistance in the base portions in the direction that is perpendicular to the direction from the first claw portions toward the second claw portions and parallel to the radially outer surface of the magnets. Furthermore, the ratio that is occupied by the magnetic material in the high magnetic resistance portions is less than the ratio that is occupied by the magnetic material in the end portions of the base portions in the direction that is perpendicular to the direction from the first claw portions toward the second claw portions and parallel to the radially outer surface of the magnets.

Embodiment 2

Figure 15:
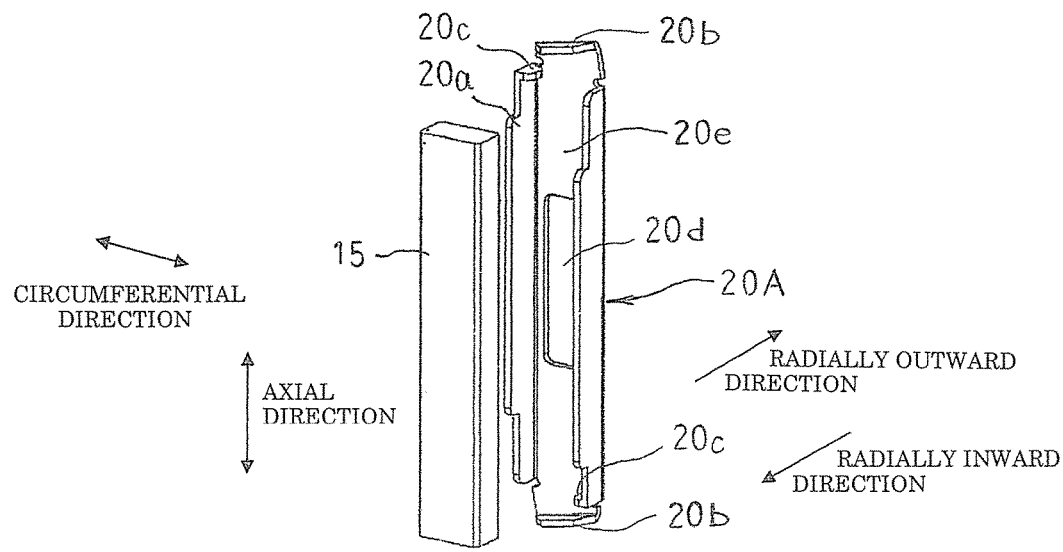
FIG. 15 is an oblique projection that shows a state of a second magnet holder and a magnet in a rotor of a rotary electric machine according to Embodiment 2 of the present invention before assembly.
Figure 16:
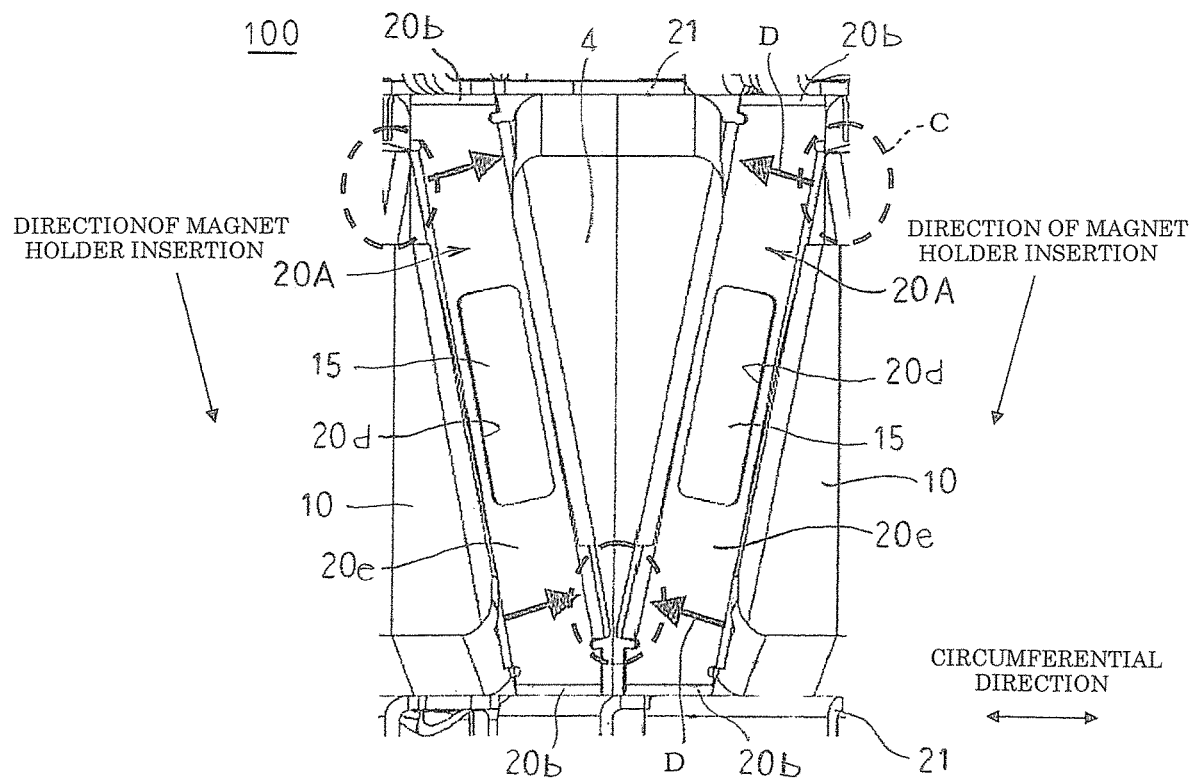
FIG. 16 is a partial side elevation in which a mounted state of second magnet holders in the rotor of the rotary electric machine according to Embodiment 2 of the present invention is viewed from radially outside.
Figure 17:
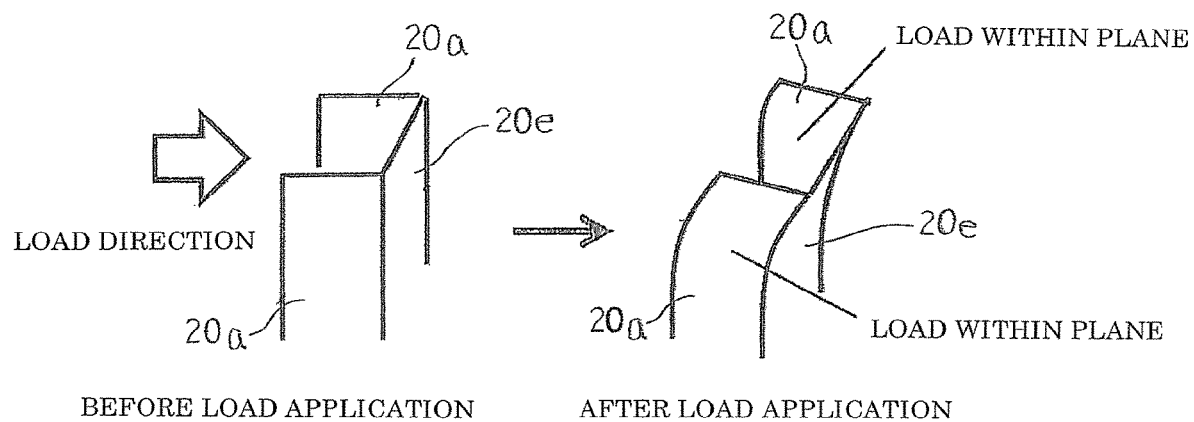
FIG. 17 is a schematic diagram that explains a deformed state of a holder when centrifugal force acts on the second magnet holders in the rotor of the rotary electric machine according to Embodiment 2 of the present invention.
Figure 18:
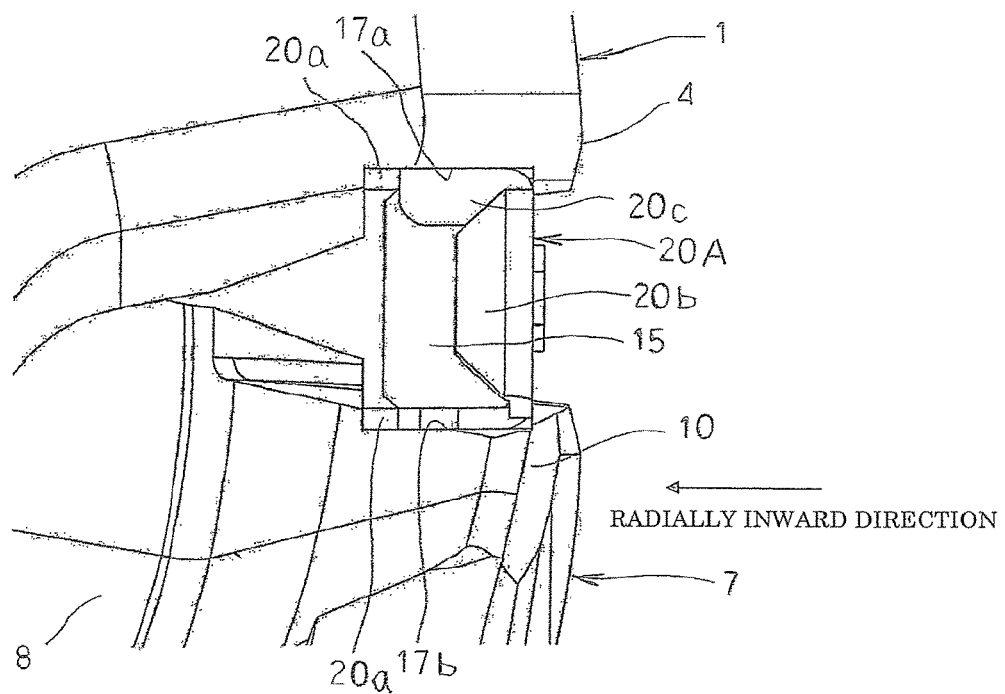
FIG. 18 is a partial top plan in which a mounted state of a magnet in the rotor of the rotary electric machine according to Embodiment 2 of the present invention is viewed from a direction that is perpendicular to a direction of magnet insertion.

FIG. 15 is an oblique projection that shows a state of a second magnet holder and a magnet in a rotor of a rotary electric machine according to Embodiment 2 of the present invention before assembly, FIG. 16 is a partial side elevation in which a mounted state of second magnet holders in the rotor of the rotary electric machine according to Embodiment 2 of the present invention is viewed from radially outside, FIG. 17 is a schematic diagram that explains a deformed state of a holder when centrifugal force acts on the second magnet holders in the rotor of the rotary electric machine according to Embodiment 2 of the present invention, and FIG. 18 is a partial top plan in which a mounted state of a magnet in the rotor of the rotary electric machine according to Embodiment 2 of the present invention is viewed from a direction that is perpendicular to a direction of magnet insertion.

First, individual constructions and assembled constructions of second magnet holders 20A and magnets 15 will be explained. In FIG. 15, the magnet 15 is produced so as to have a rectangular parallelepipedic shape in which four long sides that extend in an axial direction are chamfered. In FIG. 15, the axial direction is a direction that is parallel to a long-side direction of a radially outer surface of the magnet 15, and coincides with an axial direction of the magnet 15 and the second magnet holder 20A, and is a direction that is perpendicular to the direction from a first claw portion 4 toward a second claw portion 10 and parallel to the radially outer surface of the magnet 15. A circumferential direction is a direction that is parallel to a short-side direction and perpendicular to the long-side direction of the radially outer surface of the magnet 15, and coincides with the circumferential direction of the magnet 15 and the second magnet holder 20A, and is a direction from the first claw portion 4 toward the second claw portion 10. In FIG. 15, the axial direction coincides with the direction of insertion of the magnet 15. The second magnet holder 20A, which functions as a magnet holding member, is produced by bending a metal material that has magnetic properties, such as a rolled steel sheet, etc., and includes: a flat rectangular base portion 20e; first and second first wall portions 20a that are bent by 90 degrees in a radially inward direction on two long sides of the base portion 20e; and first and second second wall portions 20b that are bent by 90 degrees in the radially inward direction on two short sides of the base portion 20e, so as to be configured into an approximate box shape that has an opening in the radially inward direction. Third wall portions 20c are respectively produced by bending a first axial end portion of the first wall portion 20a by 90 degrees toward the second first wall portion 20a, and by bending a second axial end portion of the second first wall portion 20a by 90 degrees toward the first wall portion 20a. In addition, an oblong aperture 20d that functions as a high magnetic resistance portion is formed on a central portion of the base portion 20e such that long sides thereof are parallel to the long sides of the base portion 20e.

As shown in FIG. 15, the magnet 15 that is configured in this manner is moved radially outward so as to be housed inside the second magnet holder 20A from the open side. Thus, the magnet 15 is positioned and held inside the second magnet holder 20A such that circumferential movement thereof is restricted by the first wall portions 20a, which are spaced apart in the circumferential direction, and axial movement thereof is restricted by the third wall portions 20c, which are spaced apart in the circumferential direction. Then, the magnet 15 and the second magnet holder 20A are fixed by adhesive so as to be integrated. Here, the first wall portions 20a completely cover two circumferential side surfaces of the magnets 15.

Next, an assembled state of a rotor core and the second magnet holders 20A that have been integrated with the magnets 15 will be explained using FIG. 16. The second magnet holders 20A are inserted into magnet housing spaces that are formed between claw groove portions 17a and 17b that are formed on facing side surfaces of circumferentially adjacent first and second claw portions 4 and 10 from a direction of magnet holder insertion parallel to the inclination of the first and second claw portions 4 and 10. Then, the first and second claw portions 4 and 10 and the second magnet holders 20A that have been integrated with the magnets 15 are fixed using an adhesive, for example, so as to be integrated.

Moreover, Embodiment 2 is configured in a similar or identical manner to Embodiment 1 above except that the second magnet holders 20A are used instead of the first magnet holders 20.

According to Embodiment 2, since there are walls (the base portion 20e and the first wall portions 20a) in a radially outward direction and circumferential directions of the second magnet holders 20A, as shown in FIG. 15, when inserting the magnets 15 into the magnet housing spaces between the first and second claw portions 4 and 10 from the direction of magnet holder insertion, the base portions 20e and the first wall portions 20a of the second magnet holders 20A rub against the claw groove portions 17a and 17b while being inserted. Thus, because the magnets 15 and the claw groove portions 17a and 17b do not contact directly, the occurrence of cracking or chipping of the magnets 15 during assembly can be prevented.

Because the second magnet holders 20A have openings on a radially inner side, the magnets 15 must be inserted into the second magnet holders 20A from the radially inner side. Thus, because the insertion distance of the magnets 15 into the second magnet holders 20A is a short radial distance, rubbing between the magnets 15 and the second magnet holders 20A during insertion of the magnets 15 into the second magnet holders 20A can be reduced, enabling the occurrence of cracking or chipping of the magnets 15 to be suppressed.

In addition, because the second magnet holders 20A are produced using sheet metal, so as to have a cross-sectional shape that has walls (the base portion 20e, the first wall portions 20a, and the second wall portions 20b) in a radially outward direction, on two sides in two circumferential directions, and on two sides in two axial directions, that is, such that a cross-sectional shape in a direction that is perpendicular to the direction from the first claw portions 4 toward the second claw portions 10 and perpendicular to a direction that is parallel to the radially outer surface of the magnets 15, and a cross-sectional shape that is perpendicular to the direction from the first claw portions 4 toward the second claw portions 10 both have angular C-shaped cross-sectional shapes, the strength of the second magnet holders 20A against radially outward loads can be increased. Thus, because deformation of the magnets 15 due to centrifugal forces is suppressed, and stresses that act on the magnets 15 can be reduced, the occurrence of cracking or chipping of the magnets 15 due to centrifugal forces can be suppressed.

As shown in FIG. 16, the magnets 15 that are held by the second magnet holders 20A are disposed so as to be extend beyond claw tips of the first claw portions 4 and the second claw portions 10, as indicated by the broken-line circle portions C. Since the second magnet holders 20A are magnetic, and the second magnet holders 20A, which are constituted by a magnetic material, contact the magnets 15 and the first and second claw portions 4 and 10 even where the magnets 15 are disposed so as to be extend beyond the claw tips, a magnetic path can be formed in the direction that is indicated by the arrows D. Thus, a magnetic circuit that is closed within the rotor 100 can be formed, enabling leaking of the magnetic flux Fm from the magnets 15 toward the stator 200 to be suppressed. Thus, even if the rotor 100 rotates at high speed in a state in which field current is not being supplied to the field coil 14, voltages that are induced in the stator 200 can be kept low. Consequently, wasted electric power generation can be prevented, enabling system efficiency to be improved.

As explained in FIGS. 7 and 8, since the first claw portions 4 and the second claw portions 10 constitute a region that forms a magnetic path for the magnetic flux Fm from the magnets 15, the magnetic circuit is closed within the rotor 100, and since magnetic flux does not leak toward the stator 200, no-load induced voltages will not rise. When magnetic bodies are disposed between the first and second claw portions 4 and 10, a magnetic short-circuit is formed instead, reducing the magnetic flux density of the magnetic poles, thereby reducing output. In Embodiment 2, apertures 20d that are disposed centrally in a radially outward direction of the second magnet holders 20A are disposed on intermediate portions between the first claw portions 4 and the second claw portions 10 in the second magnet holders 20A, and a magnetic path that is formed at the base portions 20e is in a direction that is perpendicular to the direction from the first claw portions 4 toward the second claw portions 10, crossing over in a direction that is parallel to the radially outer surface of the magnets 15. Thus, magnetic resistance through the second magnet holders 20A between the facing first and second claw portions 4 and 10 is increased, enabling magnetic short-circuiting between the first and second claw portions 4 and 10 to be suppressed. The magnetic flux density of the first and second claw portions 4 and 10 is increased thereby, enabling the amount of magnetic flux that interlinks with the stator 200 to be increased. Using a configuration of this kind, a rotary electric machine that enables increases in output can be achieved while suppressing increases in no-load induced voltage.

When centrifugal forces act on the magnets 15 and the second magnet holders 20A due to the rotation of the rotor 100, radially outer portions of the claw groove portions 17a and 17b that are formed on the first and second claw portions 4 and 10 act as overhangs, and bear the centrifugal forces that act on the second magnet holders 20A at central portions in a direction that is perpendicular to the direction from the first claw portions 4 toward the second claw portions 10 and parallel to the radially outer surface of the magnets 15. Because of that, radially outward ejection of the second magnet holders 20A is suppressed. However, since there are no radially outer overhangs of the claw groove portions 17a and 17b in portions that extend beyond the claw tips of the first and second claw portions 4 and 10, centrifugal forces act to deform the second magnet holders 20A radially outward. Large stresses arise in the second magnet holders 20A at two end portions of the overhangs in the axial direction of the rotating shaft 13, i.e., in a vicinity of the claw tips of the first and second claw portions 4 and 10, in particular. Here, because the cross-sectional shape of the second magnet holders 20A perpendicular to a direction that is perpendicular to the direction from the first claw portions 4 toward the second claw portions 10 and parallel to the radially outer surface of the magnets 15 has an angular C shape, the second magnet holders 20A have high strength relative to loads that act in a radially outward direction, enabling deformation due to centrifugal forces to be suppressed.

The second magnet holders 20A having high strength against loads that act in the radially outward direction by making the cross-sectional shape perpendicular to the direction that is perpendicular to the direction from the first claw portions 4 toward the second claw portions 10 and parallel to the radially outer surface of the magnets 15 an angular C shape will now be explained in detail using FIG. 17. The second magnet holders 20A have first wall portions 20a that face in a direction from the first claw portions 4 toward the second claw portions 10. When the rotor 100 rotates, centrifugal forces act radially outward on the second magnet holders 20A. As shown in FIG. 17, these centrifugal forces act so as to deform the first wall portions 20a so as to be bent within a plane thereof. Strength of a flat plate against bending within a plane is much greater than against bending in a direction that is perpendicular to the plane. Thus, because the second magnet holders 20A have the first wall portions 20a on which the radially outward loads of centrifugal forces act so as to constitute bending within the plane, the second magnet holders 20A have a construction that is less likely to deform from radially outward loads due to centrifugal forces.

As shown in FIG. 15, because the second magnet holders 20A have the first wall portions 20a and the third wall portions 20c in the direction from the first claw portions 4 toward the second claw portions 10, and in the direction that is perpendicular to the direction from the first claw portions 4 toward the second claw portions 10 and parallel to the radially outer surface of the magnets 15, the magnets 15 can be positioned in the second magnet holders 20A using a simple configuration.

As shown in FIG. 16, because the second wall portions 20b, which are formed on end portions of the second magnet holders 20A in a direction that is perpendicular to a direction from the first claw portions 4 toward the second claw portions 10 and parallel to the radially outer surface of the magnets 15, contact bottom surfaces of cooling fans 21, the second magnet holders 20A can be prevented from dislodging in the direction that is perpendicular to the direction from the first claw portions 4 toward the second claw portions 10 and parallel to the radially outer surface of the magnets 15.

As shown in FIG. 18, in a state in which the magnets 15 are housed and held inside the second magnet holders 20A, radially inner end portions of the first wall portions 20a protrude radially further inward than the magnets 15. Thus, because the magnets 15 do not come into contact the claw groove portions 17a and 17b when the magnets 15 that are housed and held in the second magnet holders 20A are disposed in the magnet housing spaces, the occurrence of cracking and chipping of the magnets 15 due to rubbing against the first and second claw portions 4 and 10 can be prevented.

Embodiment 3

Figure 19:
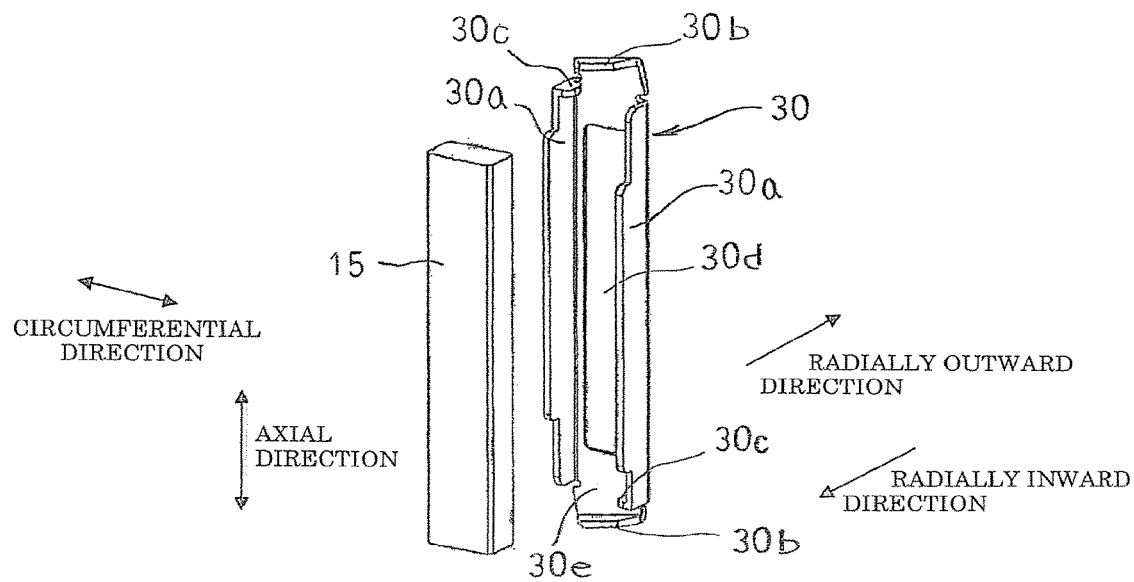
FIG. 19 is an oblique projection that shows a state of a third magnet holder and a magnet in a rotor of a rotary electric machine according to Embodiment 3 of the present invention before assembly.
Figure 20:
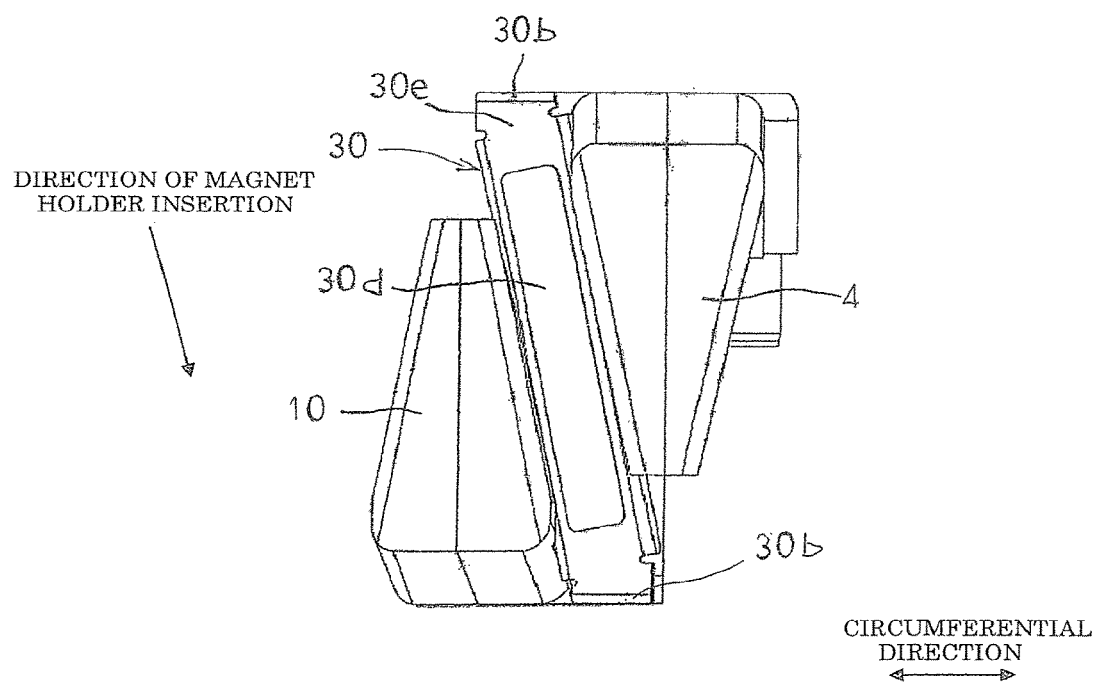
FIG. 20 is a side elevation in which a mounted state of the third magnet holder in the rotor of the rotary electric machine according to Embodiment 3 of the present invention is viewed from radially outside.

FIG. 19 is an oblique projection that shows a state of a third magnet holder and a magnet in a rotor of a rotary electric machine according to Embodiment 3 of the present invention before assembly, and FIG. 20 is a side elevation in which a mounted state of the third magnet holder in the rotor of the rotary electric machine according to Embodiment 3 of the present invention is viewed from radially outside. In FIG. 19, the axial direction is a direction that is parallel to a long-side direction of a radially outer surface of the magnet, and coincides with an axial direction of the magnet and a third magnet holder, and is a direction that is perpendicular to the direction from a first claw portion toward a second claw portion and parallel to the radially outer surface of the magnet. A circumferential direction is a direction that is parallel to a short-side direction and perpendicular to a long-side direction of the radially outer surface of the magnet, and coincides with the circumferential direction of the magnet and the third magnet holder, and is a direction from the first claw portion toward the second claw portion. An axial direction in FIG. 19 coincides with the direction of magnet insertion.

In FIGS. 19 and 20, the third magnet holder 30, which functions as a magnet holding member, is produced by bending a metal material that has magnetic properties, such as a rolled steel sheet, etc., and includes: a flat rectangular base portion 30e; first and second first wall portions 30a that are bent by 90 degrees in a radially inward direction on two long sides of the base portion 30e; and first and second wall portions 30b that are bent by 90 degrees in the radially inward direction on two short sides of the base portion 30e, so as to be configured into an approximate box shape that has an opening in the radially inward direction. Third wall portions 30c are respectively produced by bending a first axial end portion of the first first wall portion 30a by 90 degrees toward the second first wall portion 30a, and by bending a second axial end portion of the second first wall portion 30a by 90 degrees toward the first wall portion 30a. In addition, an oblong thin portion 30d that functions as a high magnetic resistance portion is formed on a central portion of the base portion 30e by applying drawing.

The third magnet holder 30 that is configured in this manner is configured in a similar or identical manner to the second magnet holder 20A except that the oblong thin portion 30d is formed on the central portion of the base portion 30e instead of the oblong aperture 20d being formed on the central portion of the base portion 20e.

Moreover, Embodiment 3 is configured in a similar or identical manner to Embodiment 2 except that the third magnet holders 30 are used instead of the second magnet holders 20A.

As shown in FIG. 20, this thin portion 30d is formed on the base portion 30e so as to extend beyond the claw tips of the first and second claw portions 4 and 10 in a state in which the third magnet holder 30 is mounted between the first and second claw portions 4 and 10. This thin portion 30d crosses over the magnetic path of the base portion 30e in the direction that is perpendicular to the direction from the first claw portions 4 toward the second claw portions 10 and parallel to the radially outer surface of the magnets 15, and becomes a high magnetic resistance portion in the base portion 30e, enabling magnetic short-circuiting between the first and second claw portions 4 and 10 to be suppressed.

Because the thin portion 30d is formed on the third magnet holder 30 instead of the aperture 20d, flexural strength is greater than in the second magnet holder 20A. Thus, flexural strength of the third magnet holder 30 in a vicinity of the claw tips of the first and second claw portions 4 and 10, where the third magnet holder 30 deforms significantly due to centrifugal forces, is increased. Deformation due to centrifugal forces in portions of the third magnet holder 30 that extend beyond the claw tips of the first and second claw portions 4 and 10 is thereby suppressed.

Embodiment 4

Figure 21:
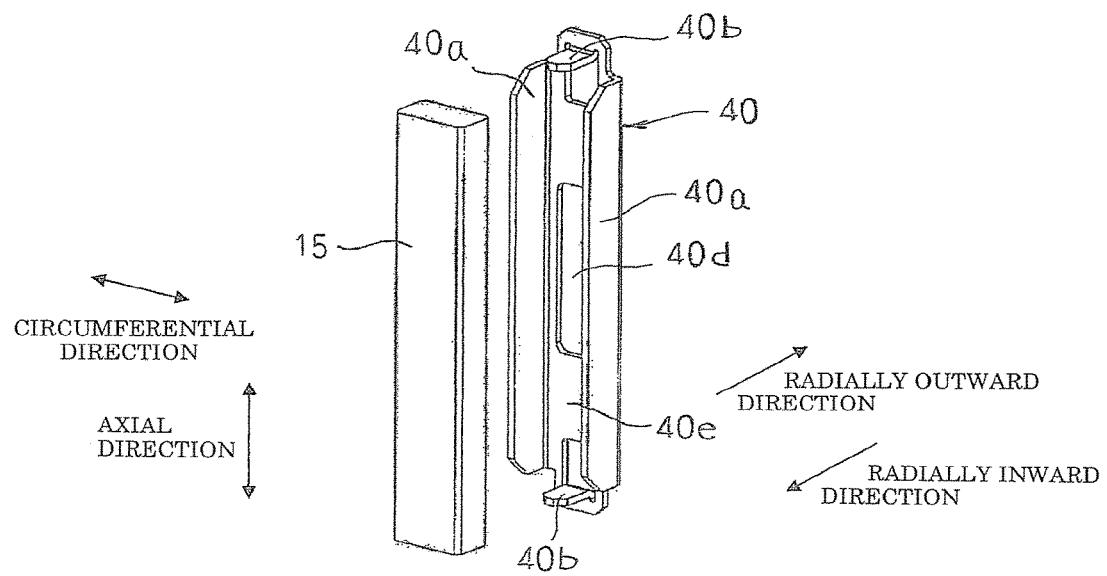
FIG. 21 is an oblique projection that shows a state of a fourth magnet holder and a magnet in a rotor of a rotary electric machine according to Embodiment 4 of the present invention before assembly.
Figure 22:
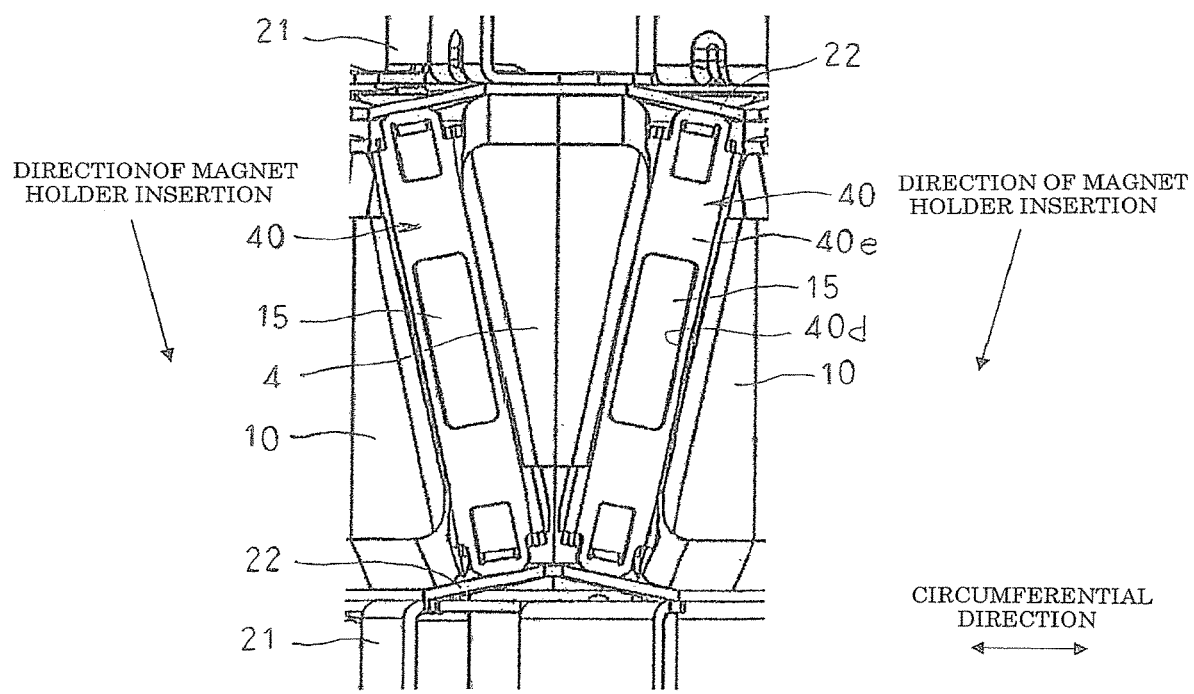
FIG. 22 is a side elevation in which a mounted state of fourth magnet holders in the rotor of the rotary electric machine according to Embodiment 4 of the present invention is viewed from radially outside.

FIG. 21 is an oblique projection that shows a state of a fourth magnet holder and a magnet in a rotor of a rotary electric machine according to Embodiment 4 of the present invention before assembly, and FIG. 22 is a side elevation in which a mounted state of fourth magnet holders in the rotor of the rotary electric machine according to Embodiment 4 of the present invention is viewed from radially outside. In FIG. 21, the axial direction is a direction that is parallel to a long-side direction of a radially outer surface of the magnet, and coincides with an axial direction of the magnet and a fourth magnet holder, and is a direction that is perpendicular to the direction from a first claw portion toward a second claw portion and parallel to the radially outer surface of the magnet. A circumferential direction is a direction that is parallel to a short-side direction and perpendicular to a long-side direction of the radially outer surface of the magnet, and coincides with the circumferential direction of the magnet and the fourth magnet holder, and is a direction from the first claw portion toward the second claw portion. An axial direction in FIG. 21 coincides with the direction of magnet insertion.

In FIG. 21, the fourth magnet holder 40, which functions as a magnet holding member, is produced by bending a metal material that has magnetic properties, such as a rolled steel sheet, etc., and includes: a flat rectangular base portion 40e; first and second first wall portions 40a that are bent by 90 degrees in a radially inward direction on two long sides of the base portion 40e; and first and second wall portions 40b that are cut and raised so as to be bent by 90 degrees in the radially inward direction in a vicinity of two short sides of the base portion 40e, so as to be configured into an approximate box shape that has an opening in the radially inward direction. An oblong aperture 40d that functions as a high magnetic resistance portion is formed on a central portion of the base portion 40e.

Moreover, Embodiment 4 is configured in a similar or identical manner to Embodiment 2 except that the fourth magnet holders 40 are used instead of the second magnet holders 20A.

In Embodiment 4, the magnet 15 that is configured in this manner is moved radially outward so as to be housed inside the fourth magnet holder 40 from the open side. Thus, the magnet 15 is positioned and held inside the fourth magnet holder 40 such that circumferential movement thereof is restricted by the first wall portions 40a, which are spaced apart in the circumferential direction, and axial movement thereof is restricted by the second wall portions 40b, which are spaced apart in the circumferential direction. Then, the magnet 15 and the fourth magnet holder 40 are fixed by adhesive so as to be integrated.

Next, an assembled state of a rotor core and the fourth magnet holders 40 that have been integrated with the magnets 15 will be explained using FIG. 22. The fourth magnet holders 40 are inserted into magnet housing spaces that are formed between facing side surfaces of circumferentially adjacent first and second claw portions 4 and 10 from a direction of magnet holder insertion parallel to the inclination of the first and second claw portions 4 and 10. Retaining members 22 are disposed between the cooling fans 21 and the first claw-shaped field core 1 and between the cooling fans 21 and the second claw-shaped field core 7, and the cooling fans 21, the first claw-shaped field core 1 and the second claw-shaped field core 7 are fixed by welding. The retaining members 22 contact two axial end portions of the fourth magnet holders 40.

In Embodiment 4, because the cross sections of the fourth magnet holders 40 perpendicular to the direction that is perpendicular to the direction from the first claw portions 4 toward the second claw portions 10 and is parallel to the radially outer surface of the magnets 15 are also formed so as to have angular C shapes, and cover the circumferential side surfaces and the radially outer surface of the magnets 15, the occurrence of cracking or chipping of the magnets 15 due to assembly and centrifugal forces can be suppressed in a similar or identical manner to Embodiment 2 above, and magnetic leakage flux from the portions of the magnets 15 that extend beyond the claw tips of the first and second claw portions 4 and 10 can be suppressed.

The apertures 40d are formed so as to cross over the magnetic paths that are formed in the base portions 40e in the direction that is perpendicular to the direction from the first claw portions 4 toward the second claw portions 10 and parallel to the radially outer surface of the magnets 15, enabling magnetic short-circuiting between the first and second claw portions 4 and 10 to be suppressed.

The magnets 15 are fixed in the direction that is perpendicular to the direction from the first claw portions 4 toward the second claw portions 10 and parallel to the radially outer surface of the magnets 15 by the second wall portions 40b, enabling positioning of the magnets 15 in the direction that is perpendicular to the direction from the first claw portions 4 toward the second claw portions 10 and parallel to the radially outer surface of the magnets 15 and displacement prevention in the direction that is perpendicular to the direction from the first claw portions 4 toward the second claw portions 10 and parallel to the radially outer surface of the magnets 15.

In Embodiment 4, because the retaining members 22 that are disposed between the fourth magnet holders 40 and the cooling fans 21 are fixed to the cooling fans 21 and the first and second claw-shaped field cores 1 and 7, and are placed in contact with the fourth magnet holders 40, dislodgment of the fourth magnet holders 40 in the direction that is perpendicular to the direction from the first claw portions 4 toward the second claw portions 10 and parallel to the radially outer surface of the magnets 15 can be reliably stopped.

Moreover, in Embodiment 4 above, the retaining members 22 that stop dislodgment of the fourth magnet holders 40 in the direction that is perpendicular to the direction from the first claw portions 4 toward the second claw portions 10 and parallel to the radially outer surface of the magnets 15 are produced as separate members from the cooling fans 21 and the first and second claw-shaped field cores 1 and 7, but the shapes of the cooling fans may be adapted to configure retaining members using portions of the cooling fans.

In Embodiment 4 above, the retaining members 22 are disposed so as to contact the fourth magnet holder 40 to stop dislodgment of the fourth magnet holders 40 in the direction that is perpendicular to the direction from the first claw portions 4 toward the second claw portions 10 and parallel to the radially outer surface of the magnets 15, but retaining members that are produced using members that have spring properties may be fixed to the cooling fans 21 or the first and second claw-shaped field cores 1 and 7, the retaining members being placed in contact with the fourth magnet holders 40 so as to generate spring forces that press the fourth magnet holders 40 in the direction that is perpendicular to the direction from the first claw portions 4 toward the second claw portions 10 and parallel to the radially outer surface of the magnets 15.

Embodiment 5

Figure 23:
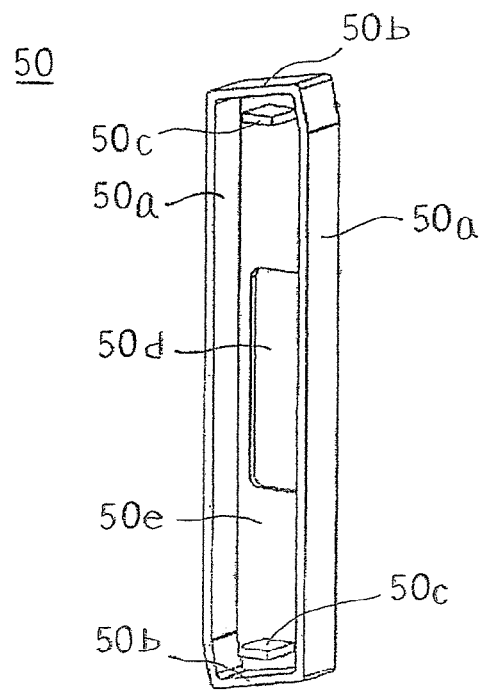
FIG. 23 is an oblique projection that shows a construction of a fifth magnet holder in a rotor of a rotary electric machine according to Embodiment 5 of the present invention.

FIG. 23 is an oblique projection that shows a construction of a fifth magnet holder in a rotor of a rotary electric machine according to Embodiment 5 of the present invention.

In FIG. 23, a fifth magnet holder 50 that functions as a magnet holding member is produced by cutting a metal material that has magnetic properties, and is formed so as to have an approximate parallelepiped box shape that has an opening in a radially inward direction, being formed into a shape in which a base portion 50e, first wall portions 50a, and second wall portions 50b are connected. Third wall portions 50c that constitute axial positioning walls for a magnet 15 are disposed so as to stand on two axial end portions of a radially inner surface of the base portion 50e. An oblong aperture 50d that functions as a high magnetic resistance portion is formed approximately centrally on the base portion 50e by applying drawing.

Moreover, Embodiment 5 is configured in a similar or identical manner to Embodiment 2 except that the fifth magnet holders 50 are used instead of the second magnet holders 20A.

In Embodiment 5, the magnet 15 that is configured in this manner is moved radially outward so as to be housed inside the fifth magnet holder 50 from the open side. Thus, the magnet 15 is positioned and held inside the fifth magnet holder 50 such that circumferential movement thereof is restricted by the first wall portions 50a, which are spaced apart in the circumferential direction, and axial movement thereof is restricted by the third wall portions 50b, which are spaced apart in the circumferential direction. Then, the magnet 15 and the fifth magnet holder 50 are fixed by adhesive so as to be integrated.

In the fifth magnet holder 50 that is formed in this manner, the occurrence of cracking or chipping of the magnets 15 during assembly can be suppressed, and magnetic leakage flux from the portions of the magnets 15 that extend beyond the claw tips of the first and second claw portions 4 and 10 can also be suppressed, in a similar or identical manner to Embodiment 1 above. Since the fifth magnet holder 50 has a box shape, holder strength can be increased compared to a construction that forms the first and second wall portions 20a and 20b by bending sheet metal, as it was in Embodiment 2 above. Thus, when centrifugal forces act on to the magnets 15 due to rotation of the rotor, deformation of the fifth magnet holder 50 can be further reduced. Thus, the risk of the occurrence of cracking or chipping of the magnets 15 due to centrifugal forces can be further reduced.

Moreover, in Embodiment 5, the fifth magnet holder 50 is produced by cutting a metal material, but first and second wall portions may be shaped by bending sheet metal, and a magnet holder configured into a box shape by welding mating surfaces of the first and second wall portions, and the method for producing the box shape is not limited thereto.

Embodiment 6

Figure 24:
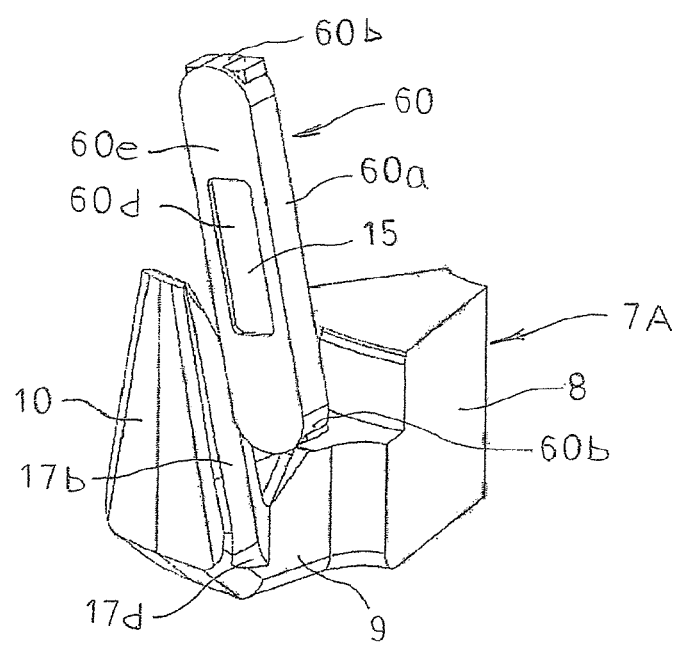
FIG. 24 is a partial oblique projection that shows a positional relationship between a sixth magnet holder and a second claw portion of a second claw-shaped field core in a rotor of a rotary electric machine according to Embodiment 6 of the present invention.
Figure 25:
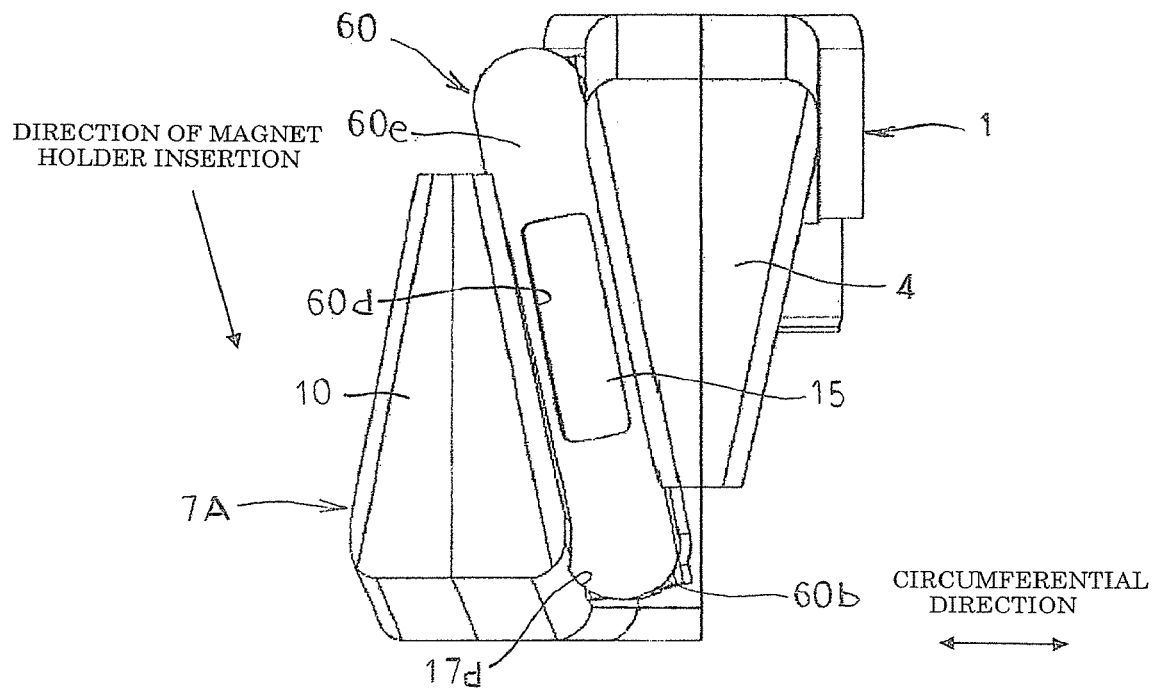
FIG. 25 is a side elevation in which a mounted state of a sixth magnet holder in the rotor of the rotary electric machine according to Embodiment 6 of the present invention is viewed from radially outside.

FIG. 24 is a partial oblique projection that shows a positional relationship between a sixth magnet holder and a second claw portion of a second claw-shaped field core in a rotor of a rotary electric machine according to Embodiment 6 of the present invention, and FIG. 25 is a side elevation in which a mounted state of a sixth magnet holder in the rotor of the rotary electric machine according to Embodiment 6 of the present invention is viewed from radially outside.

In FIG. 24, groove stopping portions 17d are formed on terminal portions in a direction that is perpendicular to a direction from first claw portions 4 toward second claw portions 10 and parallel to radially outer surface of magnets 15 of claw groove portions 17b of a second claw-shaped field core 7A that are formed on side surfaces of the second claw portions 10 in the direction from the first claw portions 4 toward the second claw portions 10, that is, on root portions of the second claw portions 10. This groove stopping portion 17d is formed so as to have a curved concave surface. Moreover, a groove stopping portion is not formed on a first claw-shaped field core 1.

A sixth fifth magnet holder 60 that functions as a magnet holding member is produced by cutting a metal material that has magnetic properties, and is formed so as to have an approximate parallelepiped box shape that has an opening in a radially inward direction, being formed into a shape in which a base portion 60e, first wall portions 60a, and second wall portions 60b are connected. Third wall portions (not shown) that constitute axial positioning walls for a magnet 15 are disposed so as to stand on two axial end portions of a radially inner surface of the base portion 60e. An oblong aperture 60d that functions as a high magnetic resistance portion is formed approximately centrally on the base portion 60e by applying drawing. In addition, an outer circumferential surface of the second wall portion 60b is formed so as to have a curved convex surface that has an identical radius of curvature to the groove stopping portions 17d.

Moreover, a remainder of the configuration is configured in a similar or identical manner to that of Embodiment 2 above.

In Embodiment 6, sixth magnet holders 60 that are integrated with magnets 15 are inserted into magnet housing spaces that are formed between claw groove portions 17a and 17b that are formed on facing side surfaces of circumferentially adjacent first and second claw portions 4 and 10 from a direction of magnet holder insertion parallel to the inclination of the first and second claw portions 4 and 10. Then, as shown in FIG. 25, the second wall portions 60b of the sixth magnet holders 60 contact the groove stopping portions 17d, positioning the sixth magnet holder 60 in the direction that is perpendicular to the direction from the first claw portions 4 toward the second claw portions 10 and parallel to the radially outer surface of the magnets 15. Then, the sixth magnet holder 60 are fixed to the first claw-shaped field core 1 by welding, gluing, etc.

According to Embodiment 6, because the second wall portions 60b of the sixth magnet holders 60 contact the groove stopping portions 17d, side surfaces of the sixth magnet holders 60 in a direction that is perpendicular to a direction from first claw portions 4 toward second claw portions 10 and parallel to radially outer surface of magnets 15 contact the second claw-shaped field core 7A, in addition to side surfaces in a direction from the first claw portions 4 toward the second claw portions 10. Thus, magnetic flux from the magnets 15 is less likely to leak toward the stator compared to Embodiment 2, which used the second magnet holders 20A in which only side surfaces in the direction from the first claw portions 4 toward the second claw portions 10 contacted the second claw-shaped field core 7A.

Here, when forming the claw groove portions 17a on the circumferential side surfaces of the first claw portions 4 of the first claw-shaped field core 1 by the cutting process, the terminal portions in the axial direction of the claw groove portions 17a can be formed into curved concave surfaces by stopping the cutting process at the terminal positions in the axial direction. Thus, production of the groove stopping portions 17d that have curved concave surfaces is facilitated.

Because the groove stopping portions 17d are formed on the terminal portion in the axial direction of the claw groove portions 17a, the sixth magnet holders 60 can be positioned in the axial direction simply by inserting the sixth magnet holders 60 from the direction of magnet holder insertion into the magnet housing spaces that are formed between the claw groove portions 17a and 17b so as to be placed in contact with the groove stopping portions 17d.

Embodiment 7

Figure 26:
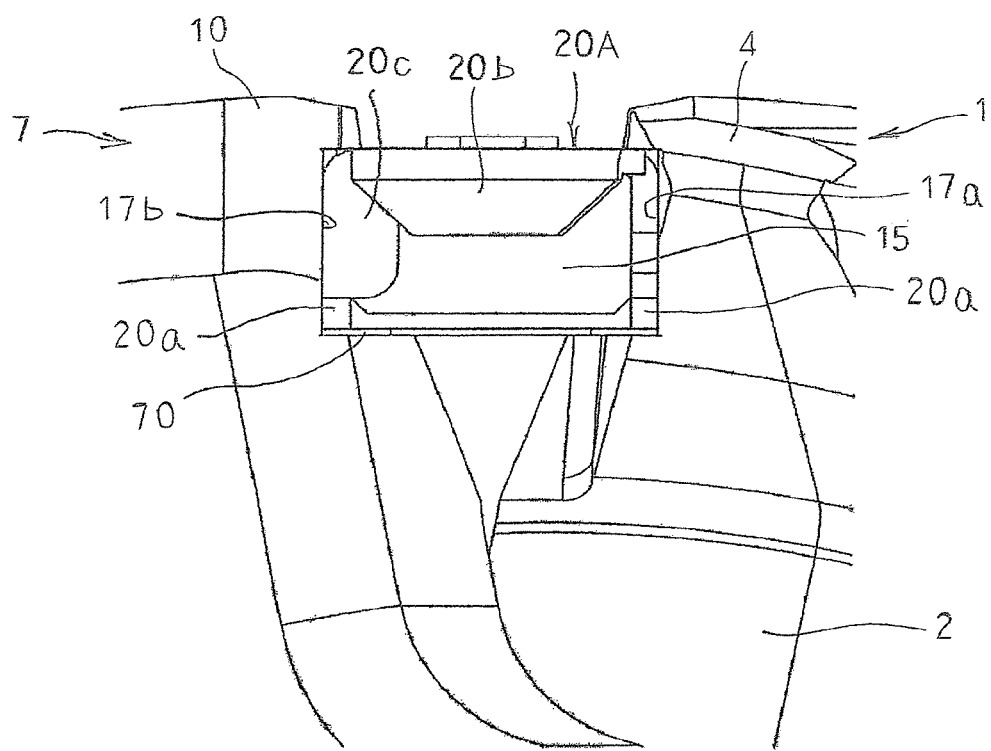
FIG. 26 is a partial top plan in which a mounted state of a magnet in the rotor of the rotary electric machine according to Embodiment 7 of the present invention is viewed from a direction that is perpendicular to a direction of magnet insertion.

FIG. 26 is a partial top plan in which a mounted state of a magnet in the rotor of the rotary electric machine according to Embodiment 7 of the present invention is viewed from a direction that is perpendicular to a direction of magnet insertion.

In FIG. 26, an insertion plate 70 is produced using a material such as a glass-reinforced epoxy resin, and is disposed on a radially inner side of a second magnet holder 20A so as to be inserted by press-fitting, etc., between overhangs in a radially inward direction of claw groove portions 17a and 17b that are formed on first and second claw portions 4 and 10 and a first wall portion 20a of the second magnet holder 20A.

Moreover, a remainder of the configuration is configured in a similar or identical manner to that of Embodiment 2 above.

Generally, when producing the claw groove portions 17a and 17b and the second magnet holders 20A, it is necessary to take manufacturing irregularities into consideration. However, if the claw groove portions 17a and 17b are manufactured so as to be larger than the second magnet holders 20A so as to allow for manufacturing irregularities, then problems may arise such as the positions of the second magnet holders 20A between the first and second claw portions 4 and 10 not being fixed. In Embodiment 6, insertion plates 70 are inserted between the overhangs in the radially inward direction of the claw groove portions 17a and 17b and the first wall portions 20a of the second magnet holders 20A by press-fitting, etc., portions of the insertion plates 70 that are positioned between the overhangs in the radially inward direction of the claw groove portions 17a and 17b and the first wall portions 20a of the second magnet holders 20A, absorbing irregularities in the dimensions of the claw groove portions 17a and 17b and the second magnet holders 20A. Thus, because the second magnet holders 20A are pressed against the radially outer overhangs of the claw groove portions 17a and 17b by the forces of recovery of the compressed and deformed insertion plates 70, the second magnet holders 20A can be positioned and fixed without wobbling between the first and second claw portions 4 and 10, even if the dimensions of the parts are irregular.

EXPLANATION OF NUMBERING

1 FIRST CLAW-SHAPED FIELD CORE; 4 FIRST CLAW PORTION; 7 SECOND CLAW-SHAPED FIELD CORE; 10 SECOND CLAW PORTION; 14 FIELD COIL; 15 MAGNET; 17a CLAW GROOVE PORTION (GUIDING GROOVE PORTION); 17b CLAW GROOVE PORTION (GUIDING GROOVE PORTION); 17d GROOVE STOPPING PORTION; 20 FIRST MAGNET HOLDER (MAGNET HOLDING MEMBER); 20A SECOND MAGNET HOLDER (MAGNET HOLDING MEMBER); 20a FIRST WALL PORTION; 20b SECOND WALL PORTION; 20c THIRD WALL PORTION; 20d APERTURE (HIGH MAGNETIC RESISTANCE PORTION); 20e BASE PORTION; 20f SLIT (HIGH MAGNETIC RESISTANCE PORTION); 21 COOLING FAN; 22 RETAINING MEMBER; 30 THIRD MAGNET HOLDER (MAGNET HOLDING MEMBER); 30a FIRST WALL PORTION; 30b SECOND WALL PORTION; 30c THIRD WALL PORTION; 30d THIN PORTION (HIGH MAGNETIC RESISTANCE PORTION); 30e BASE PORTION; 40 FOURTH MAGNET HOLDER (MAGNET HOLDING MEMBER); 40a FIRST WALL PORTION; 40b SECOND WALL PORTION; 40c THIRD WALL PORTION; 40d APERTURE (HIGH MAGNETIC RESISTANCE PORTION); 40e BASE PORTION; 50 FIFTH MAGNET HOLDER (MAGNET HOLDING MEMBER); 50a FIRST WALL PORTION; 50b SECOND WALL PORTION; 50c THIRD WALL PORTION; 50d APERTURE (HIGH MAGNETIC RESISTANCE PORTION); 50e BASE PORTION; 60 SIXTH MAGNET HOLDER (MAGNET HOLDING MEMBER); 60a FIRST WALL PORTION; 60b SECOND WALL PORTION; 60c THIRD WALL PORTION; 60d APERTURE (HIGH MAGNETIC RESISTANCE PORTION); 60e BASE PORTION; 100 ROTOR; 200 STATOR; 201 STATOR CORE; 202 STATOR COIL; 300 REAR FRAME; 301 FRONT FRAME; 302 BOLT.

The invention claimed is:

1. A rotary electric machine comprising:
   a rotor that comprises:
   a field core that comprises first claw portions and second claw portions that are arranged alternately in a circumferential direction around an outer circumferential portion, said first claw portions extending from a first end toward a second end in an axial direction, and said second claw portions extending from said second end toward said first end in said axial direction;
   a field coil that is mounted to said field core; and
   magnet holding members that are made of a magnetic material, said magnet holding members being disposed between adjacent first claw portions and second claw portions among said first claw portions and said second claw portions in a state in which magnets are housed and held; and
   a stator that comprises:
   a stator core that is made of a magnetic material; and
   a stator coil that is mounted to said stator core,
   said stator being disposed so as to face said rotor in a radial direction so as to have an air gap interposed,
   wherein:
   said magnets are disposed between said adjacent first claw portions and second claw portions so as to protrude toward said second end in said axial direction from tips of said first claw portions and so as to protrude toward said first end in said axial direction from tips of said second claw portions;
   said magnet holding members comprise a base portion that covers a radially outer surface of said magnets;
   said base portion comprises a high magnetic resistance portion that is disposed in a direction that is perpendicular to a direction from said first claw portions toward said second claw portions and parallel to said radially outer surface of said magnets so as to cross a magnetic path from said first claw portions toward said second claw portions in a region between said adjacent first claw portions and second claw portions and regions that extend beyond said tips of said first claw portions and said second claw portions;
   magnetic resistance in said high magnetic resistance portion is greater than magnetic resistance in regions of said base portion other than said high magnetic resistance portion; and
   said regions of said base portion other than said high magnetic resistance portion include a region of said base portion that protrudes toward said second end in said axial direction from said high magnetic resistance portion and a region that protrudes toward said first end in said axial direction from said high magnetic resistance portion.

2. The rotary electric machine according to claim 1, wherein said base portion covers only said radially outer surface of said magnets.

3. The rotary electric machine according to claim 1, wherein said magnet holding members are configured so as to have an angular C-shaped cross-sectional shape perpendicular to said direction that is perpendicular to said direction from said first claw portions toward said second claw portions and parallel to said radially outer surface of said magnets, said cross-sectional shape including:
   said base portion; and
   first wall portions that protrude radially inward from two end portions of said base portion in said direction from said first claw portions toward said second claw portions, and that cover two end surfaces of said magnets in said direction from said first claw portions toward said second claw portions.

4. The rotary electric machine according to claim 3, wherein said magnet holding members comprise second wall portions that protrude radially inward from two end portions of said base portion in said direction that is perpendicular to said direction from said first claw portions toward said second claw portions and parallel to said radially outer surface of said magnets, and that face two end surfaces of said magnets that are parallel to a direction from said first claw portions toward said second claw portions and are contiguous to said radially outer surface of said magnets so as to be configured so as to open on a radially inner side.

5. The rotary electric machine according to claim 4, wherein said second wall portions are connected to said first wall portions.

6. The rotary electric machine according to claim 4, wherein said second wall portions have surfaces that are parallel to a direction of said magnets from first claw portions toward said second claw portions and are spaced apart from said two end surfaces of said magnets that are contiguous to said radially outer surface of said magnets.

7. The rotary electric machine according to claim 3, wherein movement of said magnets in a direction from said first claw portions toward said second claw portions is restricted by said first wall portions.

8. The rotary electric machine according to claim 1, wherein magnetic resistance in said direction from said first claw portions toward said second claw portions in said high magnetic resistance portion is greater than magnetic resistance in said direction that is perpendicular to said direction from said first claw portions toward said second claw portions and parallel to said radially outer surface of said magnets in said high magnetic resistance portion.

9. The rotary electric machine according to claim 1, wherein a ratio of magnetic material occupied in said high magnetic resistance portion is less than a ratio of magnetic material occupied in end portions of said base portion in said direction that is perpendicular to said direction from said first claw portions toward said second claw portions and parallel to said radially outer surface of said magnets.

10. The rotary electric machine according to claim 1, wherein said high magnetic resistance portion is an aperture that is formed on said base portion.

11. The rotary electric machine according to claim 1, wherein said high magnetic resistance portion is constituted by a plurality of slits that are each formed on said base portion so as to be parallel to said direction that is perpendicular to said direction from said first claw portions toward said second claw portions and parallel to said radially outer surface of said magnets, said plurality of slits being arranged so as to line up in said direction from said first claw portions toward said second claw portions.

12. The rotary electric machine according to claim 9, wherein said high magnetic resistance portion is a thin portion that is formed on said base portion.

13. The rotary electric machine according to claim 3, wherein radially inner end portions of said first wall portions are positioned radially further inward than said magnets that are housed and held in said magnet holding members.

14. The rotary electric machine according to claim 4, wherein outer circumferential surfaces of said second wall portions have curved surfaces that have a predetermined radius of curvature that are outwardly convex from two end surfaces in a direction that is perpendicular to said direction from said first claw portions toward said second claw portions and parallel to said radially outer surface of said magnets.

15. The rotary electric machine according to claim 4, wherein:
said magnet holding members comprise third wall portions that are spaced apart in said direction that is perpendicular to said direction from said first claw portions toward said second claw portions and parallel to said radially outer surface of said magnets on a radially inner side of said base portion; and
movement of said magnet in a direction that is perpendicular to side surfaces of said magnet in said direction from said first claw portions toward said second claw portions is restricted by said first wall portions, and movement of said magnet in a direction that is perpendicular to side surfaces of said magnet in said direction that is perpendicular to said direction from said first claw portions toward said second claw portions and parallel to said radially outer surface of said magnets is restricted by said third wall portions.

16. The rotary electric machine according to claim 1, further comprising cooling fans that are fixed to two axial end surfaces of said field core,
portions of said cooling fans contacting two end portions of said magnet holding members in said direction that is perpendicular to said direction from said first claw portions toward said second claw portions and parallel to said radially outer surface of said magnets, to restrict movement of said magnet holding members in a direction that is perpendicular to said direction from said first claw portions toward said second claw portions.

17. The rotary electric machine according to claim 1, further comprising:
cooling fans that are fixed to two axial end surfaces of said field core; and
retaining members that are mounted to said cooling fans so as to contact two end portions of said magnet holding members in said direction that is perpendicular to said direction from said first claw portions toward said second claw portions and parallel to said radially outer surface of said magnets, to restrict movement of said magnet holding members in said direction that is perpendicular to said direction from said first claw portions toward said second claw portions and parallel to said radially outer surface of said magnets.

18. The rotary electric machine according to claim 1, further comprising guiding groove portions that are formed on two side surfaces of said first claw portions and said second claw portions, and that guide said magnet holding members between said first claw portions and said second claw portions from said direction that is perpendicular to said direction from said first claw portions toward said second claw portions and parallel to said radially outer surface of said magnets.

19. The rotary electric machine according to claim 18, further comprising groove stopping portions that are formed on first end portions in said direction that is perpendicular to said direction from said first claw portions toward said second claw portions and parallel to said radially outer surface of said magnets of said guiding groove portions that are formed on side surfaces of said first claw portions that face said second claw portions, and that contact first end portions of said magnet holding members in said direction that is perpendicular to said direction from said first claw portions toward said second claw portions and parallel to said radially outer surface of said magnets, to restrict movement of said magnet holding members in said direction that is perpendicular to said direction from said first claw portions toward said second claw portions and parallel to said radially outer surface of said magnets.

20. The rotary electric machine according to claim 18, further comprising insertion plates that are inserted between said guiding groove portions and said first wall portions, said magnet holding members being pressed against said guiding groove portions on a radially outer side by a force of recovery of said insertion plates.

* * * * *